(12) United States Patent
Lahti et al.

(10) Patent No.: US 9,835,094 B2
(45) Date of Patent: Dec. 5, 2017

(54) FEED FORWARD EXHAUST THROTTLE AND WASTEGATE CONTROL FOR AN ENGINE

(71) Applicant: Deere & Company, Moline, IL (US)

(72) Inventors: John L. Lahti, Cedar Falls, IA (US); Dustin W. Ridenour, Independence, IA (US); Michael J. Maney, Waterloo, IA (US); Michael J. Pipho, Dunkerton, IA (US)

(73) Assignee: DEERE & COMPANY, Moline, IL (US)

(*) Notice: Subject to any disclaimer, the term of this patent is extended or adjusted under 35 U.S.C. 154(b) by 194 days.

(21) Appl. No.: 14/832,227

(22) Filed: Aug. 21, 2015

(65) Prior Publication Data

US 2017/0051684 A1 Feb. 23, 2017

(51) Int. Cl.
*F02D 23/00* (2006.01)
*F02B 33/44* (2006.01)
(Continued)

(52) U.S. Cl.
CPC ............ *F02D 9/04* (2013.01); *F02B 29/0406* (2013.01); *F02B 37/22* (2013.01);
(Continued)

(58) Field of Classification Search
CPC .... F02D 9/04; F02D 41/0007; F02D 41/1446; F02B 37/22; F02B 37/013
(Continued)

(56) References Cited

U.S. PATENT DOCUMENTS 5,715,796 A * 2/1998 Suzuki ................ F02D 41/1441
123/492
6,035,640 A 3/2000 Kolmanovsky et al.
(Continued)

FOREIGN PATENT DOCUMENTS

CN 102374038 3/2012
DE 102011055452 5/2013
(Continued)

OTHER PUBLICATIONS

EP16185210.8 Extended European Search Report dated Jan. 30, 2017 (9 pages).
(Continued)

*Primary Examiner* — Thai Ba Trieu
(74) *Attorney, Agent, or Firm* — Michael Best & Friedrich LLP

(57) ABSTRACT

Controlling an exhaust gas temperature of an engine. An electronic control unit receives a parameter setpoint command, monitors parameters of an engine using a plurality of sensors, receives measured engine states based on the monitored engine parameters from the plurality of sensors, generates measured engine state estimates and controlled engine state estimates using an engine observer model, determines an observer error based on a difference between the measured engine states and the measured engine state estimates, generates model corrections based on the observer error, generates a desired exhaust throttle valve position using an inverse engine model based on the parameter setpoint command, the controlled engine state estimates, and the model corrections, and adjusts a position of the exhaust throttle valve based on the desired exhaust throttle position.

20 Claims, 12 Drawing Sheets

(51) Int. Cl.
*F02M 25/07* (2006.01)
*F02D 9/04* (2006.01)
*F02D 41/14* (2006.01)
*F02B 37/22* (2006.01)
*F02D 41/00* (2006.01)
*F02B 29/04* (2006.01)
*F02M 26/08* (2016.01)
*F02M 26/23* (2016.01)
*F02M 26/47* (2016.01)
*F02B 37/00* (2006.01)
*F02B 37/013* (2006.01)
*F02B 37/18* (2006.01)

(52) U.S. Cl.
CPC ..... *F02D 41/0002* (2013.01); *F02D 41/0007* (2013.01); *F02D 41/1401* (2013.01); *F02D 41/1446* (2013.01); *F02D 41/1448* (2013.01); *F02M 26/08* (2016.02); *F02M 26/23* (2016.02); *F02M 26/47* (2016.02); *F02B 37/004* (2013.01); *F02B 37/013* (2013.01); *F02B 37/18* (2013.01); *F02D 2041/0067* (2013.01); *F02D 2041/1416* (2013.01); *F02D 2041/1433* (2013.01); *F02D 2041/1434* (2013.01); *F02D 2200/0406* (2013.01); *F02D 2200/0414* (2013.01); *Y02T 10/144* (2013.01); *Y02T 10/42* (2013.01)

(58) Field of Classification Search
USPC ..... 60/602, 605.1, 605.2, 612; 701/101–103, 701/108, 109; 123/562
See application file for complete search history.

(56) References Cited

U.S. PATENT DOCUMENTS

| | | | |
|---|---|---|---|
| 6,256,575 B1 | 7/2001 | Sans | |
| 6,378,515 B1 | 4/2002 | Geyer | |
| 6,804,601 B2* | 10/2004 | Wang | F02D 41/222 60/602 |
| 6,805,095 B2 | 10/2004 | Sun et al. | |
| 7,076,955 B2 | 7/2006 | Herz et al. | |
| 7,155,334 B1 | 12/2006 | Stewart et al. | |
| 7,467,614 B2 | 12/2008 | Stewart et al. | |
| 7,512,479 B1 | 3/2009 | Wang | |
| 7,540,151 B2 | 6/2009 | Boehm et al. | |
| 7,698,049 B2* | 4/2010 | Whitney | F02D 31/002 701/103 |
| 7,770,392 B2* | 8/2010 | Birkner | F02D 41/0007 701/108 |
| 7,980,221 B2* | 7/2011 | Baur | F02D 41/1497 701/103 |
| 8,381,519 B2 | 2/2013 | Singh et al. | |
| 8,463,531 B2 | 6/2013 | Ramappan et al. | |
| 9,297,319 B2 | 3/2016 | Wang et al. | |
| 2004/0079342 A1 | 4/2004 | Kojima et al. | |
| 2004/0084015 A1* | 5/2004 | Sun | F02D 41/0072 123/399 |
| 2005/0137777 A1 | 6/2005 | Kolavennu et al. | |
| 2006/0235603 A1 | 10/2006 | Kobayashi et al. | |
| 2007/0068159 A1 | 3/2007 | Ueno et al. | |
| 2007/0101977 A1 | 5/2007 | Stewart | |
| 2007/0174003 A1 | 7/2007 | Ueno et al. | |
| 2009/0255517 A1 | 10/2009 | Ishikawa et al. | |
| 2010/0101226 A1 | 4/2010 | Shutty et al. | |
| 2011/0023848 A1 | 2/2011 | Schwarte | |
| 2011/0088674 A1 | 4/2011 | Shutty et al. | |
| 2011/0154821 A1 | 6/2011 | Evans-Beauchamp | |
| 2012/0024270 A1 | 2/2012 | Wang et al. | |
| 2012/0173118 A1 | 7/2012 | Wang et al. | |
| 2012/0222417 A1 | 9/2012 | Fontvieille et al. | |
| 2013/0013169 A1* | 1/2013 | Eser | F02D 41/1454 701/102 |
| 2013/0074492 A1 | 3/2013 | Chi et al. | |
| 2013/0080034 A1 | 3/2013 | Chi et al. | |
| 2014/0000573 A1 | 1/2014 | Hu et al. | |
| 2014/0109570 A1* | 4/2014 | Hu | F02D 41/0007 60/605.1 |
| 2014/0207361 A1 | 7/2014 | Iemura | |
| 2015/0330326 A1* | 11/2015 | Shaver | F02D 41/0007 123/445 |
| 2015/0354483 A1* | 12/2015 | Brewbaker | F02D 41/0007 60/605.2 |
| 2016/0131057 A1* | 5/2016 | Lahti | F02D 41/0077 701/103 |
| 2016/0131089 A1* | 5/2016 | Lahti | F02D 41/0007 60/605.2 |
| 2016/0146130 A1* | 5/2016 | Haskara | F02D 41/0007 701/108 |
| 2016/0326974 A1* | 11/2016 | Lahti | F02D 41/0072 |
| 2017/0051684 A1 | 2/2017 | Lahti et al. | |

FOREIGN PATENT DOCUMENTS

| | | | |
|---|---|---|---|
| EP | 1686251 | 8/2006 | |
| EP | 1811160 | 7/2007 | |
| EP | 1937952 | 7/2008 | |
| FR | 2963059 | 1/2012 | |
| FR | 2973441 | 10/2012 | |
| JP | EP 2128407 A1 * | 12/2009 | ........ F02D 41/0052 |
| WO | 03016698 | 2/2003 | |
| WO | 2013159899 | 10/2013 | |
| WO | WO 2014093643 A1 * | 6/2014 | ........ F02D 41/1447 |

OTHER PUBLICATIONS

Zhou et al., "State Estimation in the Automotive SCR DeNOx Process," The International Federation of Automatic Control, Furama Riverfront, Singapore, Jul. 10-13, 2012. pp. 501-506.

Hsieh et al., "Concentration Modeling and Observer-Based Estimation Across a Diesel Engine Aftertreatment System," Abstract of Research Paper, J. Dyn. Sys. Meas., Control 133(4), 041005, Apr. 7, 2011, 13 pages.

European Search Report in foreign counterpart application No. 15192117.8 dated Mar. 30, 2016 (8 pages).

European Search Report in foreign counterpart application No. 15192108.7 dated Apr. 12, 2016 (10 pages).

Graber, "Exploiting Actuator Limits with Feedforward Control Based on Inverse Models," Proceedings of the 10th International Modelica Conference Mar. 10-12, 2014, pp. 637-645, Sweden.

Office Action from the US Patent and Trademark Office for U.S. Appl. No. 14/539,473 dated Mar. 30, 2017 (21 pages).

Office Action from the US Patent and Trademark Office for U.S. Appl. No. 14/539,547 dated Dec. 7, 2016 (17 pages).

* cited by examiner

FEED FORWARD EXHAUST THROTTLE AND WASTEGATE CONTROL FOR AN ENGINE

BACKGROUND

This disclosure relates to controlling an engine.

SUMMARY

Diesel engines sometimes use exhaust throttles to regulate exhaust temperature by modifying the fuel-to-air ("F/A") ratio as well as engine pumping work. For example, an exhaust throttle is used to control the temperature of exhaust gasses going to an engine after-treatment system. Exhaust throttle control can incorporate various protections to prevent high intake manifold pressure, high cylinder pressure, high exhaust manifold pressure, and high turbine speed. Previously, exhaust throttle and exhaust gas temperature control was achieved using a combination of open loop setpoint tables and proportional-integral-derivative ("PID") controllers. Operational constraints were controlled by separate PID controllers and subsequent arbitration of valve position commands. Due to the dynamics of such systems, PID based control is relatively slow and unresponsive to dynamic or transient operating conditions.

This disclosure replaces the open loop setpoint tables and PID controls with a physics-based feed forward system that provides improved response under transient conditions, prioritizes control objectives, accounts for system constraints, and is easier to calibrate than existing systems. The disclosure employs an air system state observer for an engine to estimate parameters that are not and/or cannot be measured directly. Sensor information is also used to make corrections to an engine observer model. The models and corrections from the air system state observer are used in feed forward calculations to determine the desired exhaust throttle position, a desired wastegate valve position, and a desired exhaust gas recirculation ("EGR") valve position that achieve desired performance objectives. Feed forward control with this method provides fast and accurate control of the engine within the constraints of the system. The air system state observer is a model of the engine air system that runs in a controller or engine control unit ("ECU") in substantially real time and receives the same actuator commands as the real engine. Differences between measured engine states and estimated engine states are used with an observer controller to make corrections to the engine observer model. Information from the engine observer model and model corrections from the observer controller are used in feed forward calculations to determine the desired exhaust throttle valve position, wastegate valve position, and EGR valve position. The air system state observer eliminates the need for various prior control loops and provides more robust engine control. The feed forward calculations include engine cylinder models, EGR cooler and valve models, EGR mixer models, compressor and charge air cooler ("CAC") models, turbine and wastegate models, and exhaust throttle models. As a result, this disclosure improves engine control under transient conditions, improves operation in corner conditions (i.e., extreme operational conditions), limits control to stay within constraints, and is easier to calibrate.

In one embodiment, this disclosure provides a method of controlling exhaust gas temperature for an engine. The engine includes an air system having an exhaust throttle valve. The method includes receiving a parameter setpoint command at an inverse engine model, monitoring parameters of the engine using a plurality of sensors, receiving measured engine states based on the monitored engine parameters from the plurality of sensors, and generating measured engine state estimates and controlled engine state estimates using an engine observer model. The controlled engine state estimates are received by the inverse engine model. The method also includes determining an observer error based on a difference between the measured engine states and the measured engine state estimates and generating model corrections based on the observer error. The model corrections are received by the inverse engine model. The method also includes generating a desired exhaust throttle valve position using the inverse engine model based on the parameter setpoint command, the controlled engine state estimates, and the model corrections, and adjusting a position of the exhaust throttle valve based on the desired exhaust throttle position.

In another embodiment, this disclosure provides a system for controlling exhaust gas temperature. The system includes an engine, a plurality of sensors, and an electronic control unit. The engine includes an air system and an exhaust throttle valve. The plurality of sensors are used to monitor parameters of the engine. The electronic control unit includes a processor and a memory. The electronic control unit is operable to receive a parameter setpoint command at an inverse engine model, monitor parameters of the engine using the plurality of sensors, receive measured engine states based on the monitored engine parameters from the plurality of sensors, and generate measured engine state estimates and controlled engine state estimates using an engine observer model. The controlled engine state estimates are received by the inverse engine model. The electronic control unit is also operable to determine an observer error based on a difference between the measured engine states and the measured engine state estimates and generate model corrections based on the observer error. The model corrections are received by the inverse engine model. The electronic control unit is also operable to generate a desired exhaust throttle valve position using the inverse engine model based on the parameter setpoint command, the controlled engine state estimates, and the model corrections, and adjust a position of the exhaust throttle valve based on the desired exhaust throttle position.

Before any embodiments are explained in detail, it is to be understood that the disclosure is not limited in its application to the details of the configuration and arrangement of components set forth in the following description or illustrated in the accompanying drawings. This disclosure is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the disclosure may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the disclosure may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized. For example, "servers" and "computing devices" described in the specification can include one or more processing units, one or more computer-readable medium modules, one or more input/output interfaces, and various connections (e.g., a system bus) connecting the components.

Other aspects of the disclosure will become apparent by consideration of the detailed description and accompanying drawings.

DETAILED DESCRIPTION

This disclosure provides a feed forward control system for controlling the operation of an engine (e.g., a diesel engine) by controlling an exhaust gas recirculation ("EGR") valve, an exhaust throttle valve, and a wastegate valve. The control system includes an electronic control unit ("ECU") that is used to implement the feed forward control system. The ECU includes an air system state observer for the engine that is used to estimate parameters that are not and/or cannot be measured directly. Models used by, and corrections generated by, the air system state observer are used in feed forward calculations to determine a desired exhaust throttle position, a desired wastegate valve position, and a desired EGR valve position that achieve desired performance objectives. Feed forward control with this method provides fast and accurate control of the engine within the constraints of the system. The feed forward calculations include engine cylinder models, EGR cooler and valve models, EGR mixer models, compressor and charge air cooler ("CAC") models, turbine and wastegate models, and exhaust throttle models. The models are used, for example, to calculate minimum and maximum turbine flow to provide exhaust manifold pressure control within a given range and to calculate an exhaust throttle valve position that provides a desired turbine delta pressure without exceeding flow limits required for exhaust manifold pressure protection. The disclosures provided herein can be implemented in, or applied to, a variety of applications that include an engine and an exhaust throttle.

Figure 1:
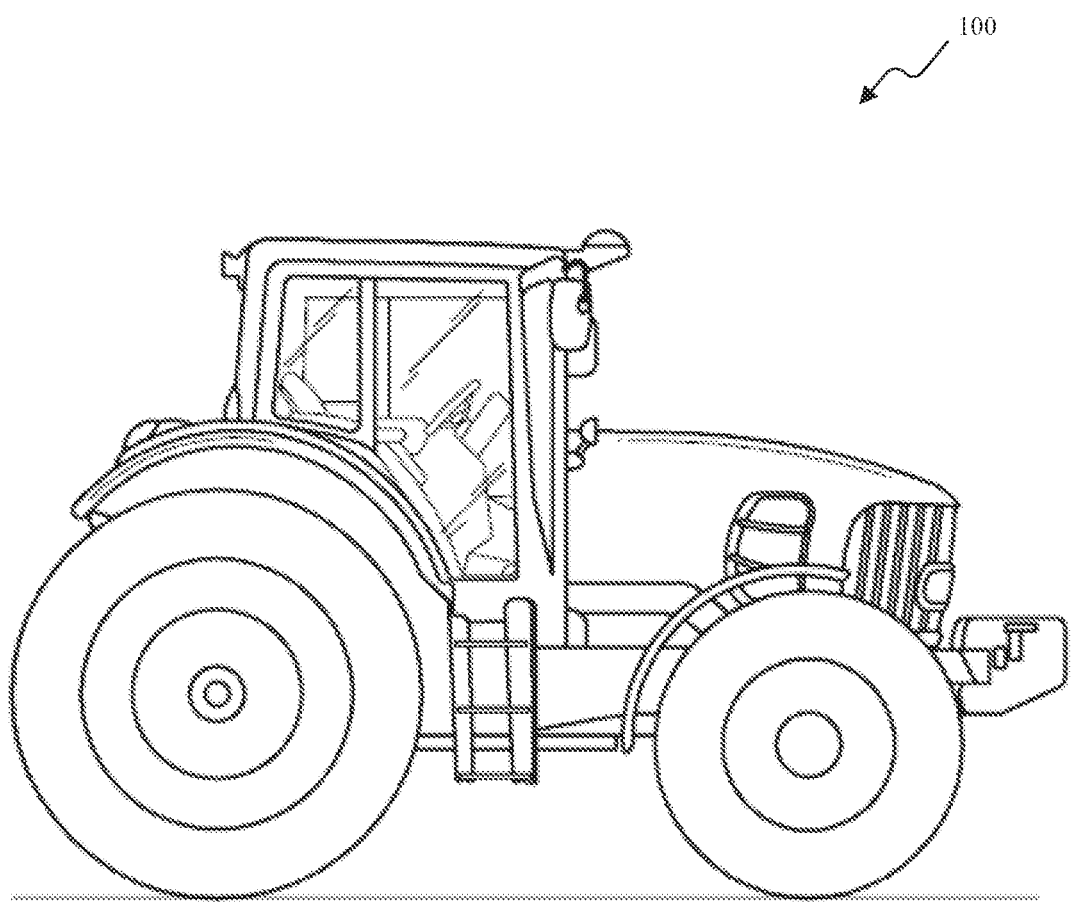
FIG. 1 illustrates a vehicle including an engine.

FIG. 1 illustrates a vehicle 100 that includes a diesel engine. Although the vehicle 100 illustrated in FIG. 1 is a tractor, the control systems and techniques described herein can be implemented in other vehicles, such as lawn mowers, utility vehicles, dump trucks, loaders, dozers, skid steers, excavators, bunchers, harvesters, etc. For descriptive purposes, the disclosure is described herein generally with respect to a vehicle that includes a diesel engine. This disclosure can, however, be applied to any apparatus or machine that includes a diesel engine and the association of the disclosure with a vehicle is only exemplary.

Figure 2:
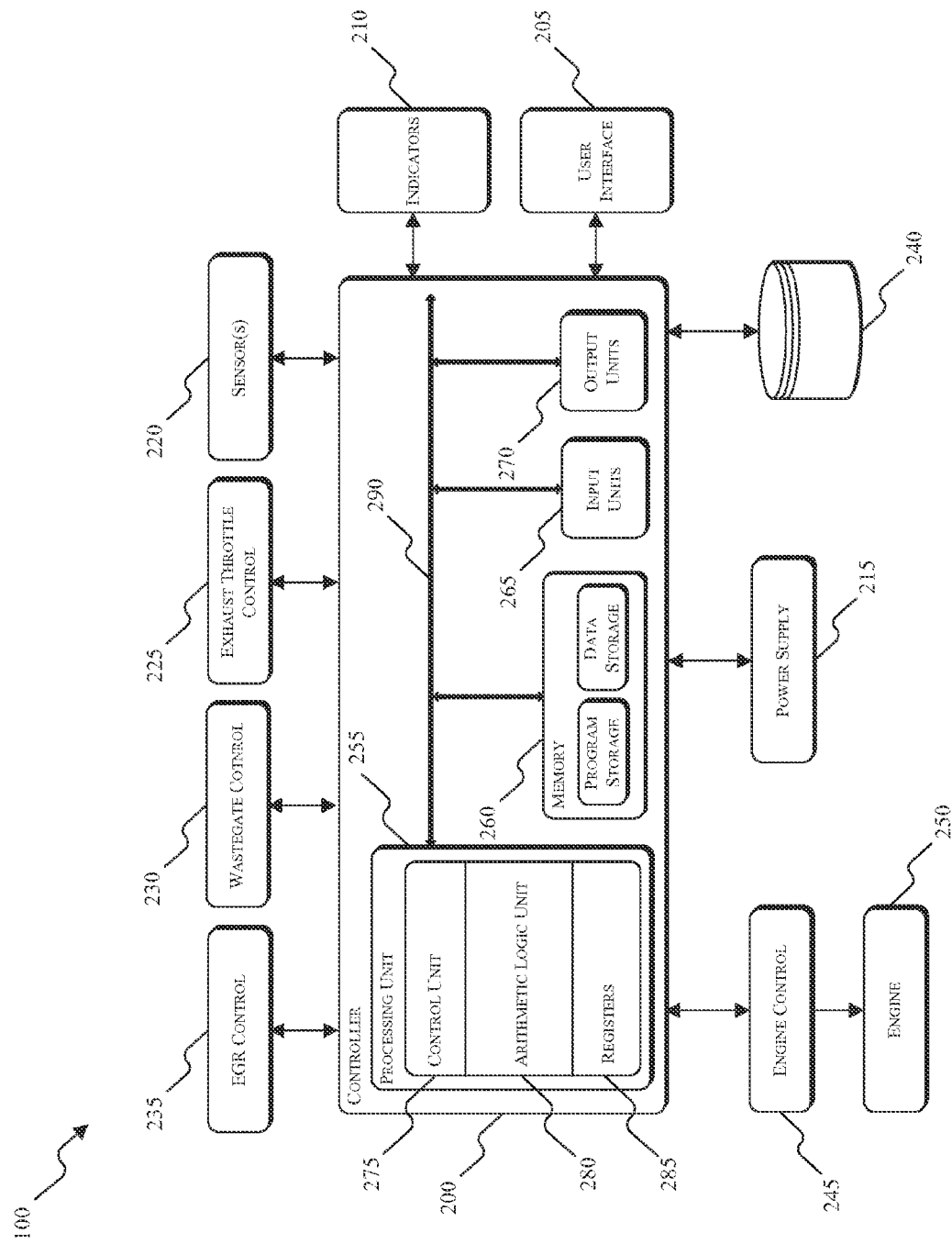
FIG. 2 illustrates a control system for the vehicle of FIG. 1.

FIG. 2 illustrates an electronic control unit ("ECU") or controller 200 associated with the vehicle 100 or another vehicle or apparatus that includes a diesel engine. The ECU 200 illustrated in FIG. 2 is, for example, an ECU for a diesel engine. The ECU 200 is connected or coupled to a variety of additional modules or components, such as a user interface module 205, one or more indicators 210, a power supply module 215, a plurality of sensors 220, an exhaust throttle control module 225, a wastegate control module 230, an exhaust gas recirculation ("EGR") control module 235, a data store or database 240, and an engine control module 245, and engine 250. The exhaust throttle control module 225, the wastegate control module 230, the EGR control module 235, and the engine control module 245 are shown as being separate from and connected to the ECU 200 for illustrative purposes. Each of these modules can alternatively be implemented entirely within the ECU 200 such that the ECU is configured, operable, or programmed to be an engine control unit for the engine 250. As is described herein, the modules 225, 230, 235, and 245 are connected to or associated with one another to achieve the desired control of the engine 250. The plurality of sensors 220 are, for example, temperature sensors, pressure sensors, position sensors (e.g., valve position sensors), humidity sensors, etc.

The ECU 200 includes combinations of hardware and software that are programmed, configured, and/or operable to, among other things, control the operation of the vehicle 100 and or engine 250, control activation of (e.g., current through) a wastegate solenoid, control a wastegate valve position, control an EGR valve position, control an exhaust throttle valve position, activate the one or more indicators 210 (e.g., a liquid crystal display ["LCD"], one or more LEDs, etc.), monitor the operation of the vehicle 100 and/or engine 250, etc. In some embodiments, the ECU 200 includes a plurality of electrical and electronic components that provide power, operational control, and protection to the components and modules within the ECU 200, the vehicle 100, and/or the engine 250. For example, the ECU 200 includes, among other things, a processing unit 255 (e.g., a microprocessor, a microcontroller, or another suitable programmable device), a memory 260, input units 265, and output units 270. The processing unit 255 includes, among other things, a control unit 275, an arithmetic logic unit ("ALU") 280, and a plurality of registers 285 (shown as a group of registers in FIG. 2), and can be implemented using a known computer architecture, such as a modified Harvard architecture, a von Neumann architecture, etc. The processing unit 255, the memory 260, the input units 265, and the output units 270, as well as the various modules connected to the ECU 200 are connected by one or more control and/or data buses (e.g., common bus 290). The control and/or data buses are shown generally in FIG. 2 for illustrative purposes. The use of one or more control and/or data buses for the interconnection between and communication among the various modules and components would be known to a person skilled in the art in view of this disclosure. In some embodiments, the ECU 200 is implemented partially or entirely on a semiconductor chip, is a field-programmable gate array ("FPGA"), is an application specific integrated circuit ("ASIC"), etc.

The memory 260 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices or data structures. The processing unit 255 is connected to the memory 260 and executes software instructions that are capable of being stored in a RAM of the memory 260 (e.g., during execution), a ROM of the memory 260 (e.g., on a generally permanent basis), or another non-transitory computer readable medium such as another memory or a disc. Software and instructions included in the implementation of the vehicle 100 and/or engine 250 can be stored in the memory 260 of the ECU 200. The software includes, for example, firmware, one or more applications, program data, filters, rules, one or more program modules, and other executable instructions. The ECU 200 is configured, operable, or programmed to retrieve from the memory 260 and execute, among other things, instructions related to the control processes and methods described herein. In other constructions, the ECU 200 includes additional, fewer, or different components or modules.

The user interface module 205 is used to control or monitor the vehicle 100 and/or engine 250 (e.g., is within a cabin of the vehicle 100). The user interface module 205 can include a combination of digital and analog input or output devices required to achieve a desired level of control and monitoring for the vehicle 100. For example, the user interface module 205 can include a display and input devices such as a touch-screen display, one or more knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other constructions, the display is a Super active-matrix OLED ("AMO-LED") display. The user interface module 205 can also be configured to display conditions or data associated with the vehicle 100 and/or engine 250 in real-time or substantially real-time. For example, the user interface module 205 is configured to display sensed or measured temperatures, pressures, valve positions, diluent-to-air ("D/A") ratios, fuel-to-air ("F/A") ratios, etc. In some embodiments, the user interface module 205 is controlled in conjunction with the one or more indicators 210 (e.g., LEDs) to provide visual indications of the status or conditions of the vehicle 100 and/or engine 250.

Figure 3:
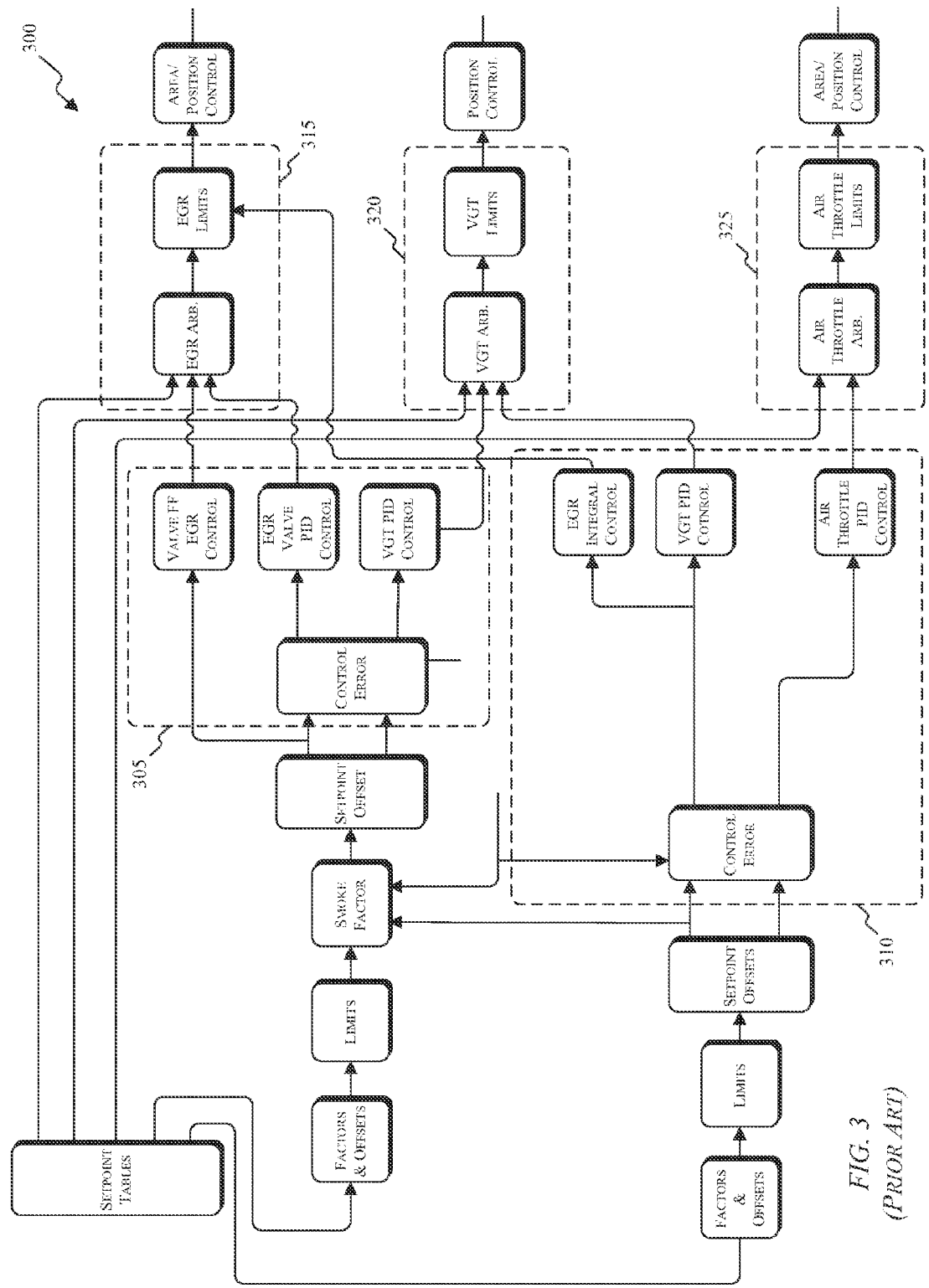
FIG. 3 illustrates an engine control system that includes proportional integral derivative ("PID") controllers and output control arbitration.

FIG. 3 illustrates an existing engine control system 300 that utilizes proportional-integral-derivative ("PID") control with output control arbitration. The system 300 is not described in detail herein. However, the system 300 includes PID control modules 305 and 310, as well as output control arbitration modules 315, 320, and 325. The system 300 is implemented with feedback control to determine a desired EGR valve position, a variable-geometry turbocharger ("VGT") position, and an air throttle position. The PID control modules 305 and 310 calculate the desired positions, and the output controls 315, 320, and 325 prevent the system 300 from operating an engine outside of its operational limits. As a result of the feedback controls, PID control modules 305 and 310, and the output control arbitration modules 315, 320, and 325, the system 300 is relatively slow and unresponsive to dynamic or transient operating conditions.

Figure 4:
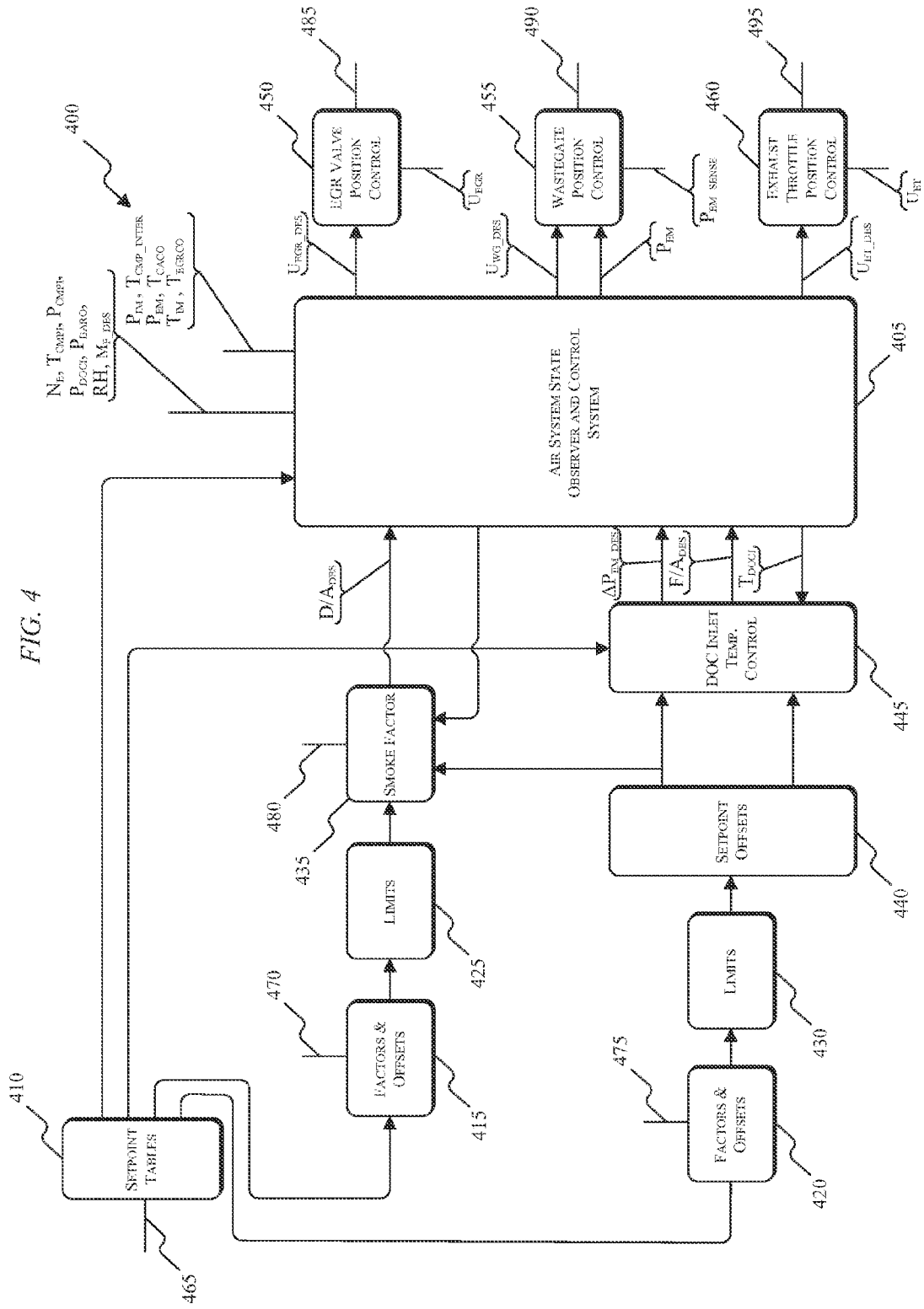
FIG. 4 illustrates an engine control system that includes an air system state observer and control system.

FIG. 4 illustrates an engine control system 400 including an air system state observer and control module or unit 405. The system 400 provides quicker and more efficient control of the engine 250 than the system 300 of FIG. 3. The system 400 includes a setpoint tables module 410, a first factors and offsets module 415, a second factors and offsets module 420, a first limits module 425, a second limits module 430, a smoke factor module 435, a setpoint offsets module 440, an after-treatment system module (e.g., a diesel oxidation catalyst ["DOC"] inlet temperature control module) 445, the air system state observer and control system 405, an EGR valve position control module 450, a wastegate position control module 455, and an exhaust throttle position control module 460. The setpoint tables module 410 receives a variety of inputs 465 related to, for example, engine speed, desired amount of fuel (e.g., per cylinder of the engine 250), torque-speed curve information, and control mode settings. The setpoint tables modules 410 outputs a variety of factors, such as an EGR valve maximum position, a DOC inlet temperature setpoint, a D/A ratio setpoint, and an F/A ratio setpoint. The factors and offsets modules 415 and 420 can also receive a variety of inputs 470 and 475, respectively, such as ambient temperature multipliers, ambient pressure multipliers, etc. The smoke factor module 435 can receive inputs 480 such as a smoke opacity F/A ratio limit, an F/A ratio estimate, etc. The modules of system 400 described so far are similar to modules shown in the system 300 of FIG. 3 and will not be described in detail herein.

The DOC inlet temperature control module 445, the air system state observer and control system 405, the EGR valve position control module 450, the wastegate position control module 455, and the exhaust throttle position control module 460, however, differ from the system 300 of FIG. 3. In FIG. 4, the air system state observer and control system 405 receives a desired diluent-to-air ratio, $D/A_{des}$, a desired fuel-to-air ratio, $F/A_{des}$, and a desired exhaust manifold delta pressure for a temperature change, $\Delta P_{em\_des}$. The air system state observer and control system 405 also receives a variety of additional sensed temperatures, pressures, speeds, etc., as described below. The air system state observer and control system 405 outputs a desired EGR valve position, $u_{egr\_des}$, a desired wastegate position, $u_{wg\_des}$, and a desired exhaust throttle position, $u_{et\_des}$, for controlling an EGR valve, a wastegate solenoid, and an exhaust throttle using the EGR valve position control module 450, the wastegate position control module 455, and the exhaust throttle position control module 460, respectively. The EGR valve position control module 450 outputs an EGR valve control signal 485 (e.g., a control signal having a duty cycle corresponding to the desired EGR valve position). The wastegate position control module 455 outputs a wastegate solenoid control signal 490 (e.g., a control signal having a duty cycle corresponding to the desired wastegate position). The exhaust throttle position control module 460 outputs an exhaust throttle position control signal 495 (e.g., a control signal having a duty cycle corresponding to the desired exhaust throttle position). The operation the air system state observer and control system 405 is described in detail below.

Figure 5:
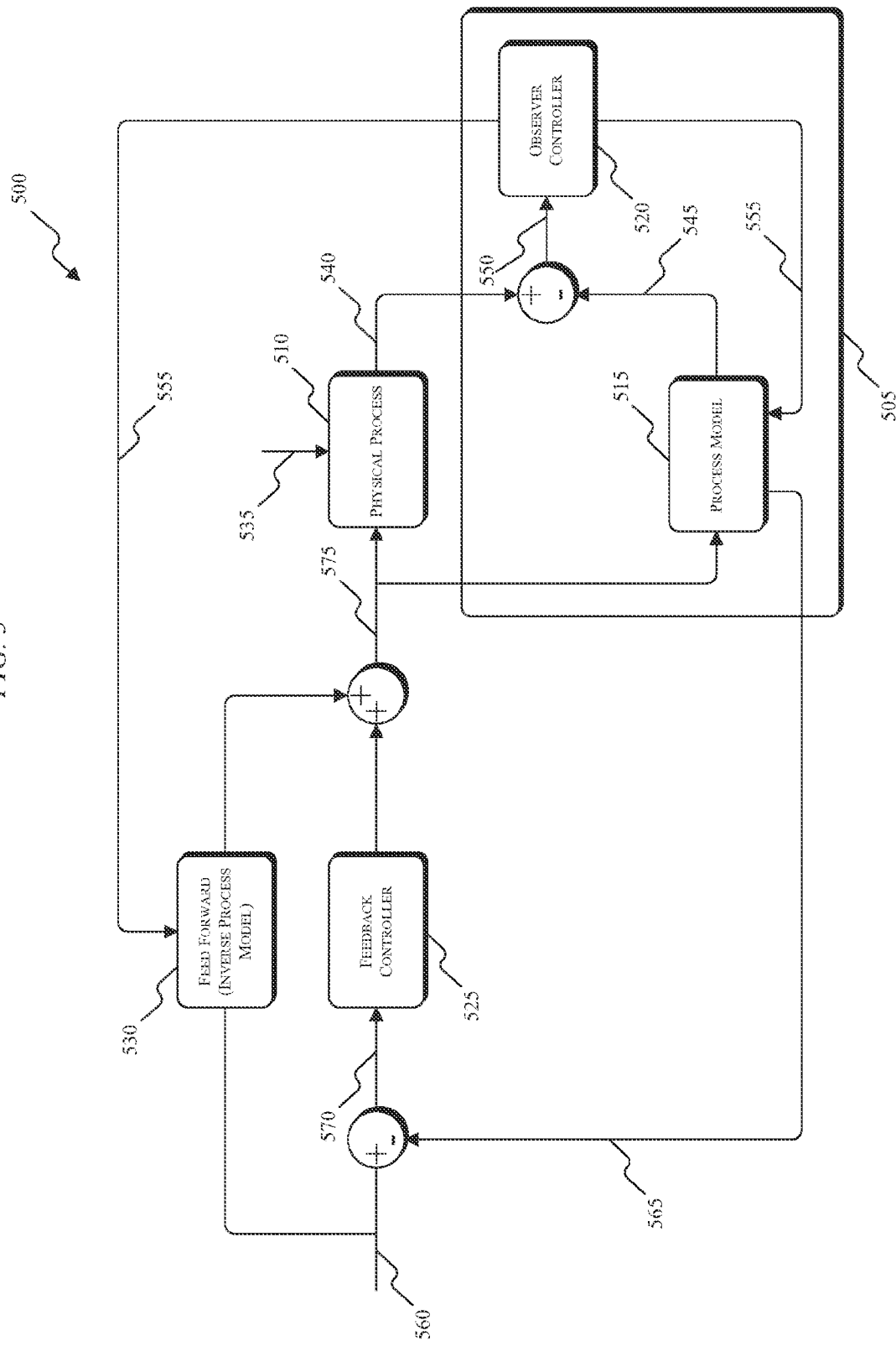
FIG. 5 illustrates a generalized state observer.

FIG. 5 illustrates a generalized state observer control system 500 that includes a state observer 505. The state observer 505 is a mathematical model of a process that is being controlled and executed by the ECU 200. The state observer control system 500 that includes a physical process 510 that is being modeled by a process model 515, as well as an observer controller 520, a feedback controller 525 and a feed forward controller 530. The feed forward controller 530 is an inverse of the process model 515. The process model 515 is not a perfect model of the physical process 510 because the physical process 510 experiences disturbances 535 that are not accounted for by the process model 515. Sensors used to monitor the physical process 510 provide a measured state 540, and the process model 515 outputs a measured state estimate 545. The difference between the measured state 540 and the measured state estimate 545 provides an observer error 550 that is input to the observer controller 520. The observer controller 520 processes the observer error 550 and generates a model correction 555 that is input to the process model 515 and to the feed forward controller 530. Setpoint commands 560 indicating desired values for process parameters are input to the control system 500. The setpoint commands 560 are input to the feed forward controller 530. The difference between the setpoint commands 560 and a controlled state estimate 565 generated by the process model 515 produces a control error 570 that is input to the feedback controller 525. The sum of the outputs of the feedback controller 525 and the feed forward controller 530 produces actuator commands 575 that are input to the physical process 510 and the process model 515.

There are a variety of advantages to implementing a state observer within an engine control system. The state observer can provide estimates of states that are difficult, expensive, and/or impossible to measure directly (e.g., fewer sensors may be required). The process model 515 with corrections from the observer controller 520 can be used in the feed forward calculation of the actuator commands 575. The inverse process model 530 has desired states or setpoint commands 560 as inputs, and the corresponding actuator commands 575 are the outputs. Feed forward control of this type provides fast response and can reduce the complexity of feedback control. Such a technique can also make it easier to implement system constraints because the constraints can be treated as limits within the feed forward and feedback control, thus eliminating the need for separate controllers for modifying the actuator commands (i.e., output arbitration control). Using an observer 505 in the control system 500 can also improve the operation of an engine in non-standard conditions because the model 515 can predict the effects of changes and adjust the controls as needed.

Figure 6:
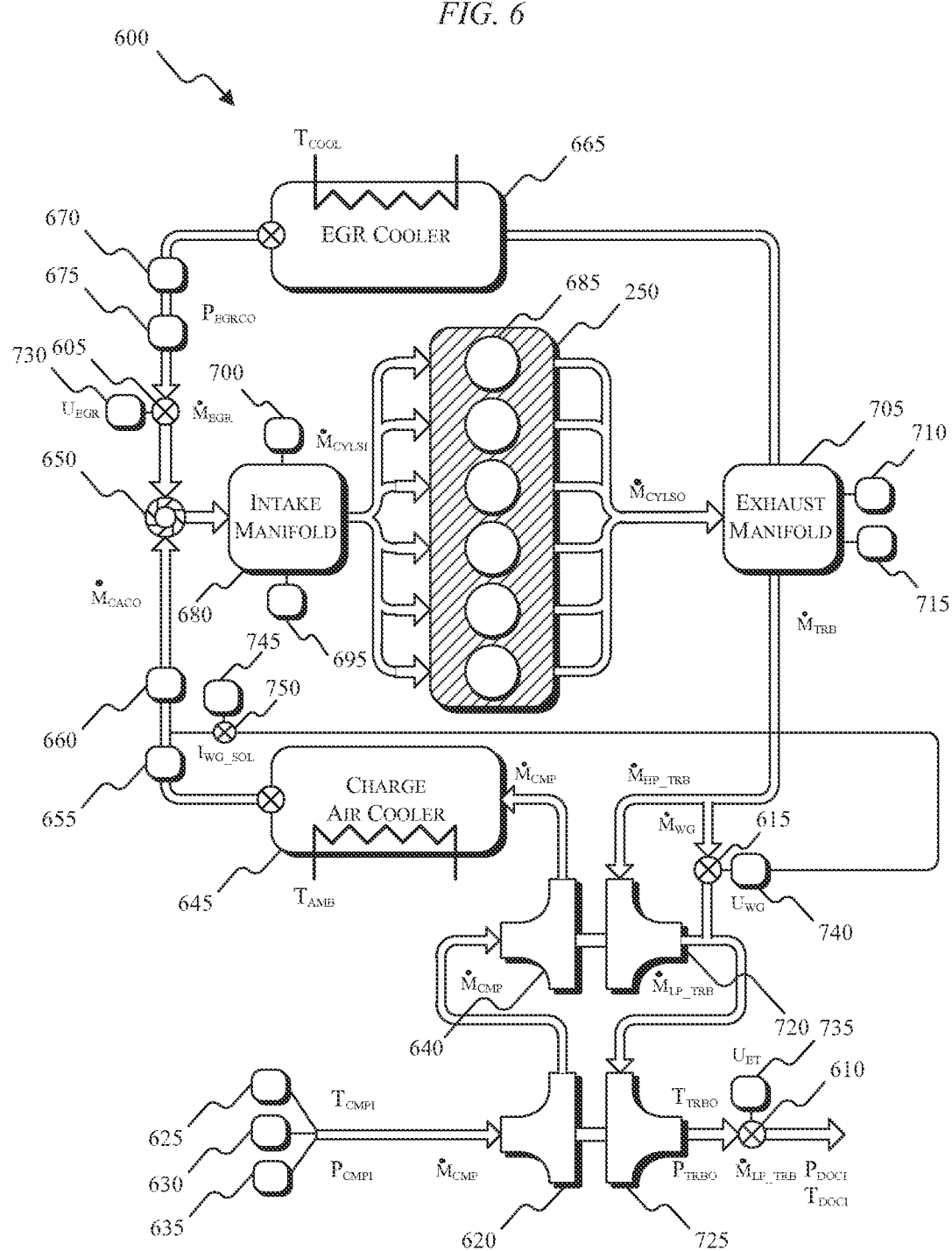
FIG. 6 is an engine air system schematic diagram.

The generalized state observer control system 500 of FIG. 5 is adapted for use in an engine 250 (e.g., a diesel engine) to control the air system of the engine 250. A schematic view of an engine and air system 600 is illustrated in FIG. 6. The engine system 600 illustrates various components, state variables, mass flows, and sensors used to control an EGR valve 605, an exhaust throttle valve 610, and a wastegate valve 615. Air enters the system 600 at a compressor inlet into a low pressure compressor 620. A temperature sensor 625, a pressure sensor 630, and a humidity sensor 635 are located at the inlet to the low pressure compressor 620. The low pressure compressor 620 compresses the air and sends it to a high pressure compressor 640 where it is further compressed. The compressed air from the high pressure compressor 640 is input to a charge air cooler ("CAC") 645. Various parameters, for example, pressure, temperature and diluent mass fraction in the CAC 645 can be monitored. The output from the CAC 645 passes to a mixer 650. A temperature sensor 655 and a pressure sensor 660 are positioned between the CAC 645 and the mixer 650 to measure the CAC outlet temperature and pressure.

The mixer 650 mixes fresh air from the CAC 645 and recirculated exhaust gasses from an exhaust gas recirculation ("EGR") cooler 665. A temperature sensor 670 and a pressure sensor 675 are positioned between the EGR cooler 665 and the EGR valve 605 to measure the temperature and pressure at the outlet of the EGR cooler 665. The mixed gasses from the mixer 650 are fed to an engine intake manifold 680, and the output of the engine intake manifold 680 is divided among a plurality of cylinders 685 of the engine 250. The engine 250 of FIG. 6 is illustrated as including six cylinders. In some embodiments, the engine 250 includes a difference number of cylinders (e.g., two cylinders, four cylinders, 8 cylinders, etc.). A temperature sensor 695 and a pressure sensor 700 are positioned with respect to the intake manifold 680 to measure the temperature and pressure of the intake manifold 680.

The exhaust gasses from the cylinders 685 of the engine 250 are fed to an engine exhaust manifold 705. The exhaust gasses from the exhaust manifold 705 are either recirculated through the EGR cooler 665 or expelled from the system 600. A temperature sensor 710 and a pressure sensor 715 are positioned with respect to the exhaust manifold 705 to measure the temperature and pressure of the exhaust manifold 705. Some of the exhaust gasses expelled from the exhaust manifold 705 pass through a high pressure turbine 720 and a low pressure turbine 725 of a turbocharger. The high pressure turbine 720 can be controlled using the wastegate valve 615. The low pressure turbine 725 can be controlled using the exhaust throttle valve 610.

Additionally, a position sensor 730 is used to measure the position of the EGR valve 605 and generate a corresponding output signal. A position sensor 735 is used to measure the position of the exhaust throttle 610 and generate a corresponding output signal. In some embodiments, a position sensor 740 is used to measure the position of the wastegate valve 615 and generate a corresponding output signal. In some embodiments, a position sensor 745 is used to measure the position of a wastegate solenoid 750 that is used to control the wastegate valve 615. In some embodiments, additional parameters such as additional pressures, additional temperatures, engine speeds, turbocharger speeds, exhaust back pressure, etc., are also measured and/or monitored within the system 600 by additional sensors 220 and the ECU 200.

The system 600 shown in FIG. 6 can be modeled by the ECU 200 using state equations that are based on the conservation of mass, energy, and momentum. Some relationships can be approximated using, for example, first order filters. Each state equation describes a rate of change. The state value at any given time can then be determined by integrating the state equation. Within the ECU 200, each state of the engine 250 and/or system 600 can be given an initial condition, and a state value at each time step of the ECU 200 can be updated using numeric integration. The state equations for the system 600 are described below with continued reference to the system 600 of FIG. 6. Values for various parameters described herein are calculated or determined estimations or estimated values for the parameter unless the parameter or value for the parameter is referred to as a sensed value or sensed parameter, or the parameter or value for the parameter is described as being received from a physical sensor (e.g., a temperature sensor, a pressure sensor, etc.).

A rate of change of mass in the CAC 645, $$\frac{dm_{cac}}{dt},$$

is modeled by the difference between the mass flow coming in from the compressors 620, 640, $\dot{m}_{cmp}$, and the mass flow exiting the CAC 645, $\dot{m}_{caco}$, as shown below in EQN. 1:

$$\frac{dm_{cac}}{dt} = \dot{m}_{cmp} - \dot{m}_{caco} \quad \text{EQN. 1}$$

A rate of change of mass in the intake manifold 680, $$\frac{dm_{im}}{dt},$$

is modeled by the sum of the mass flows exiting the CAC 645, $\dot{m}_{caco}$, and the EGR valve 605, $\dot{m}_{egr}$, minus the mass flow entering the engine 250, $\dot{m}_{cylsi}$, as shown below in EQN. 2:

$$\frac{dm_{im}}{dt} = \dot{m}_{caco} + \dot{m}_{egr} - \dot{m}_{cylsi} \quad \text{EQN. 2}$$

The rate of change of diluent mass in the intake manifold 680, $$\frac{dm_{d\_im}}{dt},$$

is modeled as the sum of the mass flow exiting the CAC 645, $\dot{m}_{caco}$, multiplied by the mass fraction of diluent in the CAC 645, $\chi_{d\_cac}$, (we can assume it is the same as the mass fraction of water in ambient air due to humidity) plus the mass flow entering from the EGR valve 605, $\dot{m}_{egr}$, multiplied by the mass fraction of diluent in the exhaust manifold 705, $\chi_{d\_em}$, minus the mass flow entering the cylinders 685 of the engine 250, $\dot{m}_{cylsi}$, multiplied by the mass fraction of diluent in the intake manifold 680, $\chi_{d\_im}$, as shown below in EQN. 3:

$$\frac{dm_{d\_im}}{dt} = \dot{m}_{caco} \cdot \chi_{d\_cac} + \dot{m}_{egr} \cdot \chi_{d\_em} - \dot{m}_{cylsi} \cdot \chi_{d\_im} \quad \text{EQN. 3}$$

The term diluent is used herein to describe everything other than dry air or fuel that is included in a mixture.

A rate of change of mass in the exhaust manifold 705, $$\frac{dm_{em}}{dt},$$

is modeled by the mass flow exiting the cylinders 685 of the engine 250, $\dot{m}_{cylso}$, minus the mass flow entering the EGR cooler 665, $\dot{m}_{egr}$, and the mass flow entering the high pressure and low pressure turbines 720, 725, $\dot{m}_{trb}$, as shown below in EQN. 4:

$$\frac{dm_{em}}{dt} = \dot{m}_{cylso} - \dot{m}_{egr} - \dot{m}_{trb} \quad \text{EQN. 4}$$

A rate of change of diluent mass in the exhaust manifold 705, $$\frac{dm_{d\_em}}{dt},$$

is modeled by the difference between the mass flow exiting the cylinders 685 of the engine 250, $\dot{m}_{cylso}$, multiplied by the mass fraction of diluent exiting the cylinders 685 of the engine 250, $\chi_{d\_cylso}$, and the sum of the mass flows entering the EGR cooler 665, $\dot{m}_{egr}$, and the high and low pressure turbines 720, 725, $\dot{m}_{lp\_trb}$, multiplied by the mass fraction of diluent in the exhaust manifold 705, $\chi_{d\_em}$, as shown below in EQN. 5:

$$\frac{dm_{d\_em}}{dt} = \dot{m}_{cylso} \cdot \chi_{d\_cylso} - (\dot{m}_{egr} + \dot{m}_{lp\_trb}) \cdot \chi_{d\_em} \quad \text{EQN. 5}$$

A rate of change of temperature at the output of the CAC 645, $$\frac{dT_{caco}}{dt},$$

is modeled by the difference between the steady state temperature at the output of the CAC 645, $T_{caco\_ss}$, and the measured temperature at the output of the CAC 645, $T_{caco}$, divided by a time constant for the CAC 645, $\tau_{cac}$, as shown below in EQN. 6:

$$\frac{dT_{caco}}{dt} = \frac{(T_{caco\_ss} - T_{caco})}{\tau_{cac}} \quad \text{EQN. 6}$$

A rate of change of temperature at the output of the EGR cooler 665, $$\frac{dT_{egrco}}{dt},$$

is modeled by the difference between the steady state temperature at the output of the EGR cooler 665, $T_{egrco\_ss}$, and the measured temperature at the output of the EGR cooler 665, $T_{egrco}$, divided by a time constant for the EGR cooler 665, $\tau_{egrc}$, as shown below in EQN. 7:

$$\frac{dT_{egrco}}{dt} = \frac{(T_{egrco\_ss} - T_{egrco})}{\tau_{egrc}} \quad \text{EQN. 7}$$

The steady state cooler outlet temperatures $T_{caco\_ss}$ and $T_{egrco\_ss}$ can be calculated using a heat exchanger effectiveness model. The effectiveness can be calibrated using a table with mass flow as the input. An effectiveness of "1" means the cooler outlet temperature is equal to the temperature of the cooling fluid, and an effectiveness of "0" means there is no change in temperature between the cooler inlet and outlet.

A rate of temperature change of the intake manifold 680, $$\frac{dT_{im}}{dt},$$

is calculated using the mass flows in and out, the temperature in and out, and the change in mass within the intake manifold 680. The rate of change of temperature of the intake manifold $$\frac{dT_{im}}{dt}$$

is modeled by the rate of change of mass at the output of the CAC 645, $\dot{m}_{caco}$, multiplied by the specific heat at constant pressure, $C_P$, multiplied by the temperature at the output of the CAC 645, $T_{caco}$, plus the mass flow of the EGR valve 605, $\dot{m}_{egr}$, multiplied by specific heat at constant pressure, $C_P$, multiplied by the temperature at the output of the EGR cooler 665, $T_{egrco}$, minus the mass flow entering the cylinders 685 of the engine 250, $\dot{m}_{cylsi}$, multiplied by specific heat at constant pressure, $C_P$, multiplied by the temperature of the intake manifold, $T_{im}$, minus the rate of change of mass in the intake manifold 680, $$\frac{dm_{im}}{dt},$$

multiplied by specific heat at constant volume, $C_V$, multiplied by the temperature of the intake manifold 680, $T_{im}$, all divided by the product of the mass in the intake manifold 680, $m_{im}$, multiplied by the specific heat at constant volume, $C_V$, as shown below in EQN. 8:

$$\frac{dT_{im}}{dt} = \frac{\dot{m}_{caco} \cdot C_p \cdot T_{caco} + \dot{m}_{egr} \cdot C_p \cdot T_{egrco} - \dot{m}_{cylsi} \cdot C_p \cdot T_{im} - \frac{dm_{im}}{dt} \cdot C_v \cdot T_{im}}{m_{im} \cdot C_v} \quad \text{EQN. 8}$$

The specific heats can be measured experimentally at constant volume or constant pressure. The specific heat at constant pressure, $C_P$, is greater than the specific heat at constant volume, $C_V$, because as a mixture is heated at constant pressure it expands and does work on the container or the fluid around it. The specific heat at constant pressure, $C_P$, can be used to calculate energy flow into or out of a control volume. The specific heat at constant volume, $C_V$, can be used to calculate the change in energy within the control volume due to changes in temperature and mass.

A rate of change of temperature at the exhaust manifold 705, $$\frac{dT_{em}}{dt},$$

is modeled by the difference between the temperature at the output of the cylinders 685 of the engine 250, $T_{cylso}$, and the temperature of the exhaust manifold 705, $T_{em}$, divided by a time constant, $\tau_{em}$, for the exhaust manifold 705, as shown below in EQN. 9:

$$\frac{dT_{em}}{dt} = \frac{(T_{cylso} - T_{em})}{\tau_{em}} \quad \text{EQN. 9}$$

A rate of change of the speed of the low pressure turbocharger 725, $$\frac{dN_{lpt}}{dt},$$

is modeled by the sum of the torques on the low pressure turbine shaft and blades divided by the inertia of the low pressure turbocharger shaft and blades (i.e., Newton's second law for rotation). The sum of the torques is modeled by the difference between low pressure turbine power, $\dot{W}_{lp\_trb}$, and low pressure compressor power, $\dot{W}_{lp\_cmp}$, divided by the low pressure turbocharger speed, $N_{lpt}$. The turbine power or compressor power can be calculated from the change in enthalpy of the gas as it goes through the turbine or compressor. The enthalpy change is equal to the mass flow rate multiplied by the specific heat at constant pressure, $C_P$, multiplied by the delta temperature across the turbine or compressor. When turbine speed is expressed in units of revolutions per minute ("RPM"), turbine speed can be converted to radians per second ("rad/s") using a factor of $\pi/30$. The inverse of this factor is squared in EQN. 10 to convert the low pressure turbocharger speed, $N_{lpt}$, in the denominator and also to express the solution, $$\frac{dN_{lpt}}{dt},$$

in units of revolutions per minute per second (rpm/s).

$$\frac{dN_{lpt}}{dt} = \frac{1}{J_{lpt}} \cdot \left(\frac{\dot{W}_{lp\_trb} - \dot{W}_{lp\_cmp}}{N_{lpt}}\right) \cdot \left(\frac{30/\pi \text{ rpm}}{\text{rad/s}}\right)^2 \quad \text{EQN. 10}$$

A rate of change in the speed of the high pressure turbocharger, $$\frac{dN_{hpt}}{dt},$$

is modeled by the sum of the torques on the high pressure turbine shaft and blades divided by the inertia of the high pressure turbocharger shaft and blades (i.e., Newton's second law for rotation). The sum of the torques is modeled by the difference between high pressure turbine power, $\dot{W}_{hp\_trb}$, and high pressure compressor power, $\dot{W}_{hp\_cmp}$, divided by the high pressure turbocharger speed, $N_{hpt}$. The turbine power or compressor power can be calculated from the change in enthalpy of the gas as it goes through the turbine or compressor. The enthalpy change is equal to the mass flow rate multiplied by the specific heat at constant pressure, $C_p$, multiplied by the delta temperature across the turbine or compressor. When turbine speed is expressed in units of RPM, turbine speed can be converted to rad/s using a factor of $\pi/30$. The inverse of this factor is squared in EQN. 11 to convert high pressure turbocharger speed, $N_{hpt}$, in the denominator and also to express the solution, $$\frac{dN_{hpt}}{dt},$$

in units of revolutions per minute per second (rpm/s).

$$\frac{dN_{hpt}}{dt} = \frac{1}{J_{hpt}} \cdot \left(\frac{\dot{W}_{hp\_trb} - \dot{W}_{hp\_cmp}}{N_{hpt}}\right) \cdot \left(\frac{30/\pi \text{ rpm}}{\text{rad/s}}\right)^2 \quad \text{EQN. 11}$$

In addition to the state equations (i.e., EQNS. 1-11) associated with the engine system 600, cylinder masses associated with the materials in the cylinders 685 (i.e., entering the cylinders 685 and exiting the cylinders 685) are also used to control the engine system 600. The cylinders 685 of the engine 250 are described with respect to the mass of material entering a cylinder. The total mass of material entering a cylinder 685, $m_{cyli}$, is calculated based on the pressure in the intake manifold 680, $P_{im}$, the volume of the cylinder 685, $V_{cyl\_disp}$, the volumetric efficiency, VE, of the cylinder 685 (e.g., based on engine speed to fuel tables), the temperature of the intake manifold 680, $T_{im}$, and the ideal gas constant, R, as shown below in EQN. 12:

$$m_{cyli} = \frac{P_{im} \cdot V_{cyl\_disp} \cdot VE}{R \cdot T_{im}} \quad \text{EQN. 12}$$

The material entering the cylinder 685 is part diluent and part air. The diluent mass entering the cylinder 685, $m_{d\_cyli}$, is calculated by multiplying the mass of material entering the cylinder 685, $m_{cyli}$, by the mass fraction of diluent in the intake manifold 680, $\chi_{d\_im}$, as shown below in EQN. 13:

$$m_{d\_cyli} = m_{cyli} \chi_{d\_im} \quad \text{EQN. 13}$$

An air mass entering the cylinder 685, $m_{a\_cyli}$, is calculated by multiplying the mass of material entering the cylinder 685, $m_{cyli}$, by the difference between one and the mass fraction of diluent in the intake manifold 680, $\chi_{d\_im}$, as shown below in EQN. 14:

$$m_{a\_cyli} = m_{cyli}(1 - \chi_{d\_im}) \quad \text{EQN. 14}$$

An amount of residual mass remaining in the cylinder 685, $m_{res}$, (e.g., gasses remaining from one cycle of the cylinder to the next cycle of the cylinder) is calculated based on the pressure in the exhaust manifold 705, $P_{em}$, the clearance volume between the piston and the cylinder head when the piston is at top-dead-center ("TDC"), $V_{cyl\_clear}$, a residual mass correction factor, $CF_{res}$, for the cylinder 685, the temperature of the output of the cylinder 685, $T_{cylo}$, and the ideal gas constant, R, as shown below in EQN. 15:

$$m_{res} = \frac{P_{em} \cdot V_{cyl\_clear} \cdot CF_{res}}{R \cdot T_{cylo}} \quad \text{EQN. 15}$$

Residual material remaining in the cylinder 685 is also part diluent and part air. The diluent mass remaining in the cylinder 685, $m_{d\_res}$, is calculated by multiplying the mass of residual material remaining in the cylinder 685, $m_{res}$, by the mass fraction of diluent at the output of the cylinder 685, $\chi_{d\_cylso}$, as shown below in EQN. 16:

$$m_{d\_res} = m_{res} \chi_{d\_cylso} \quad \text{EQN. 16}$$

An air mass remaining in the cylinder 685, $m_{a\_res}$, is calculated by multiplying the mass of residual material remaining in the cylinder 685, $m_{res}$, by the difference between one and the mass fraction of diluent at the output of the cylinder 685, $\chi_{d\_cylso}$, as shown below in EQN. 17:

$$m_{a\_res} = m_{res} \cdot (1 - \chi_{d\_cylso}) \quad \text{EQN. 17}$$

A mass of material in the cylinder 685 (i.e., when the intake valve closes), $m_{cyl}$, can then be calculated as the sum total mass of material entering the cylinder 685, $m_{cyli}$, and the mass of residual material remaining in the cylinder 685 from a previous cycle, $m_{res\_previous}$, as shown below in EQN. 18:

$$m_{cyl} = m_{cyli} + m_{res\_previous} \quad \text{EQN. 18}$$

A total mass of material in the cylinder 685, $m_{cyl}$, is also comprised of diluent and air, and each portion can be calculated. The mass of diluent in the cylinder 685, $m_{d\_cyl}$, can be calculated as the sum of the mass of diluent entering the cylinder 685, $m_{d\_cyli}$, and the mass of residual diluent from the previous cycle, $m_{d\_res\_previous}$, as shown below in EQN. 19:

$$m_{d\_cyl} = m_{d\_cyli} + m_{d\_res\_previous} \quad \text{EQN. 19}$$

Similarly, a mass of air in the cylinder 685, $m_{a\_cyl}$, can be calculated as the sum of the mass of air entering the cylinder 685, $m_{a\_cyli}$, and the mass of residual air from the previous cycle, $m_{a\_res\_previous}$, as shown below in EQN. 20:

$$m_{a\_cyl} = m_{a\_cyli} + m_{a\_res\_previous} \quad \text{EQN. 20}$$

A mass of material exiting the cylinder 685, $m_{cylo}$, can be calculated as the mass of material entering the cylinder 685, $m_{cyli}$, plus the mass of fuel in the cylinder 685, $m_f$, plus the mass of residual material remaining in the cylinder 685 from a previous cycle, $m_{res\_previous}$, minus the mass of residual material remaining in the cylinder 685, $m_{res}$, as shown below in EQN. 21:

$$m_{cylo} = m_{cyli} + m_f + m_{res\_previous} - m_{res} \quad \text{EQN. 21}$$

A mass flow entering the cylinder 685, $\dot{m}_{cylsi}$, and the mass flow exiting the cylinder 685 can then be calculated based on the mass of material entering the cylinder, $m_{cyli}$, and the mass of material exiting the cylinder, $m_{cylo}$, respectively. The mass flow entering the cylinder 685 is calculated based on the speed of the engine 250, $N_e$, the number of cylinders in the engine 250, $n_{cyls}$, and the mass of material entering the cylinder 685, $m_{cyli}$, as shown below in EQN. 22:

$$\dot{m}_{cylsi} = \frac{N_e \cdot n_{cyls} \cdot m_{cyli}}{(2 \text{ rev/cycle}) \cdot (60 \text{ sec/min})} \quad \text{EQN. 22}$$

The mass flow entering the cylinder 685, $\dot{m}_{cylsi}$ is converted for an intake event occurring every two revolutions of the engine 250 by dividing by two revolutions per cycle multiplied by 60 seconds per minute.

Similarly, the mass flow exiting the cylinder, $\dot{m}_{cylso}$, is calculated based on the speed of the engine 250, $N_e$, the number of cylinders in the engine 250, $n_{cyls}$, and the mass of material exiting the cylinder 685, $m_{cylo}$, as shown below in EQN. 23:

$$\dot{m}_{cylso} = \frac{N_e \cdot n_{cyls} \cdot m_{cylo}}{(2 \text{ rev/cycle}) \cdot (60 \text{ sec/min})} \quad \text{EQN. 23}$$

Again, the mass flow exiting the cylinder 685, $\dot{m}_{cylso}$, is converted for an intake event occurring every two revolutions of the engine 250 by dividing by two revolutions per cycle multiplied by 60 seconds per minute.

The inlet and outlet temperatures of each cooler 645 and 665 can be modeled and/or the temperatures can be measured. Half of the cooler can be assumed to be at the inlet temperature and half of the cooler can be assumed to be at the outlet temperature. The average cooler density can be calculated using the average temperature and average pressure. Assuming a linear drop in pressure and temperate across the cooler, the average temperature and average pressure can be calculated by averaging inlet and outlet values. The mass flow out for each cooler 645 and 665 can be calculated by multiplying the average density by the table output and then taking the square root. A CAC mass flow correction factor $CF_{cac}$ and an EGR mass flow correction factor $CF_{egr}$ can be included in these mass flow calculations for the coolers 645 and 665, as shown below in EQNS. 24 and 25:

$$\dot{m}_{caco} = \quad \text{EQN. 24}$$
$$CF_{cac} \cdot \sqrt{\rho_{cac\_avg} \cdot CACFlowSqOverDensityTbl(\Delta P_{cac}, \Delta T_{cac})}$$

$$\dot{m}_{egrco} = CF_{egrc} \cdot \quad \text{EQN. 25}$$
$$\sqrt{\rho_{egrc\_avg} \cdot EGRCFlowSqOverDensityTbl(\Delta P_{egrc}, \Delta T_{egrc})}$$

The CAC mass flow correction factor, $CF_{cac}$, can be applied as a correction to the compressor mass flow estimates and the CAC mass flow estimates. The EGR mass flow correction factor, $CF_{egr}$, can be applied as a correction to the EGR cooler mass flow estimates and the EGR valve mass flow estimates.

The mass flows for the EGR valve 605, the wastegate valve 615, and the exhaust throttle 610 can be modeled using the compressible gas flow equation for an orifice, as shown below in EQNS. 26, 27, and 28, respectively:

$$\dot{m}_{egrv} = CF_{egrv} \cdot C_{d\_egr}(u_{egr}) \cdot A_{egr} \cdot \frac{P_{egrco}}{\sqrt{R \cdot T_{egrco}}} \cdot \Psi\left(\frac{P_{im}}{P_{egrco}}\right) \quad \text{EQN. 26}$$

$$\dot{m}_{wg} = CF_{trb} \cdot C_{d\_wg}(u_{wg}) \cdot A_{wg} \cdot \frac{P_{em}}{\sqrt{R \cdot T_{em}}} \cdot \Psi\left(\frac{P_{trb\_inter}}{P_{em}}\right) \quad \text{EQN. 27}$$

$$\dot{m}_{et} = CF_{trb} \cdot C_{d\_et}(u_{et}) \cdot A_{et} \cdot \frac{P_{trbo}}{\sqrt{R \cdot T_{trbo}}} \cdot \Psi\left(\frac{P_{doci}}{P_{trbo}}\right) \quad \text{EQN. 28}$$

where $C_{d\_egr}$ is the discharge coefficient for the EGR valve 605, which can be calibrated using a table with EGR valve position, $u_{egr}$, as the input, $C_{d\_wg}$ is the discharge coefficient for the wastegate 615, which can be calibrated using a table with wastegate valve position, $u_{wg}$, as the input and $C_{d\_et}$ is the discharge coefficient for the exhaust throttle 610, which can be calibrated using a table with exhaust throttle position, $u_{et}$, as the input. The areas, A, can be calculated using actuator bore diameters. The term, R, is the ideal gas constant. The compressible gas flow function, $\Psi$, is a function of pressure ratio and can be calibrated using a table with pressure ratio as the input. The table values can be calculated off-line using EQNS. 29 and 30:

$$\Psi\left(\frac{P_{out}}{P_{in}}\right) = \left(\frac{P_{out}}{P_{in}}\right)^{\frac{1}{k}} \cdot \sqrt{\frac{2 \cdot k}{k+1} \cdot \left(1 - \left(\frac{P_{out}}{P_{in}}\right)^{\frac{k-1}{k}}\right)} \quad \text{EQN. 29}$$

$$\text{for } \left(\frac{P_{out}}{P_{in}}\right) \geq \left(\frac{2}{k+1}\right)^{\frac{k}{k-1}}$$

$$\Psi\left(\frac{P_{out}}{P_{in}}\right) = \sqrt{k \cdot \left(\frac{2}{k+1}\right)^{\frac{k+1}{k-1}}} \quad \text{EQN. 30}$$

$$\text{for } \left(\frac{P_{out}}{P_{in}}\right) < \left(\frac{2}{k+1}\right)^{\frac{k}{k-1}}$$

where the term, k, represents the ratio of specific heats $C_p/C_v$.

Figure 7:
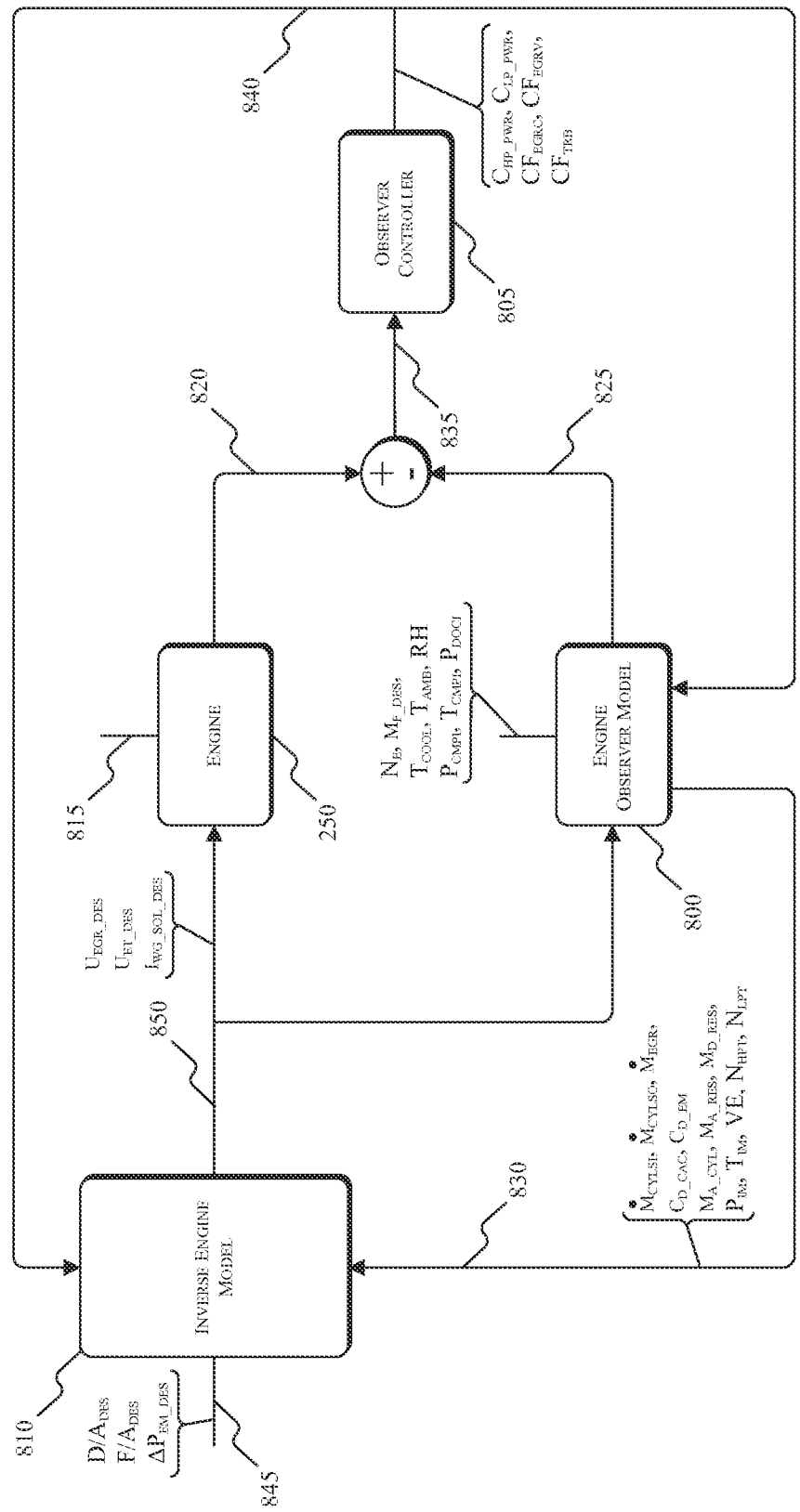
FIG. 7 illustrates an air system state observer and control system.

The state equations, cylinder masses, and engine mass flows described above can then be used to control the engine 250 using the air system state observer and control system 405. FIG. 7 illustrates the air system state observer and control system 405 from FIG. 4 in more detail. In the system 405, desired in-cylinder states are converted to manifold states. The desired mass flows to achieve the manifold states are calculated, and flow models and model corrections are used to calculate the desired actuator positions for the engine 250. The control system 405 includes the engine 250, an engine observer model 800, an observer controller 805, and an inverse engine model 810.

The engine 250 experiences disturbances 815 (e.g., deposits in engine, air leaks, valves not opening, etc.) that are not modeled by the engine observer model 800. Sensors monitoring the engine 250 provide a measured state 820. The engine observer model 800 processes various inputs (including, for example, speeds, masses, pressures, temperatures, model corrections, etc.) and generates a measured state estimate 825 to be compared with the measured state 820, as well as controlled state estimates 830 that are provided to the inverse engine model 810. The engine observer model includes, for example, state equations, mass flow equations, and cylinder equations corresponding to EQNS. 1-30 above. The difference between the measured state 820 and the measured state estimate 825 provides an observer error 835 that is input to the observer controller 805. The observer controller 805 generates model corrections 840 that are provided to the engine observer model 800 and the inverse engine model 810. The model corrections generated by the observer controller 805 can include an integral term that drives the steady state error to zero. This can help keep the operation of the engine observer model 800 close to that of the engine 250.

The inverse engine model or feed forward controller 810 takes the controlled state estimates 830 generated by the engine observer model 800, the model corrections 840 generated by the observer controller 805, the desired state inputs 845, and various other system parameters and calculates desired engine state commands 850 to achieve the desired diluent-to-air ratio, $D/A_{des}$, and fuel-to-air ratio, $F/A_{des}$, values included in the desired state inputs 845.

Figure 8:
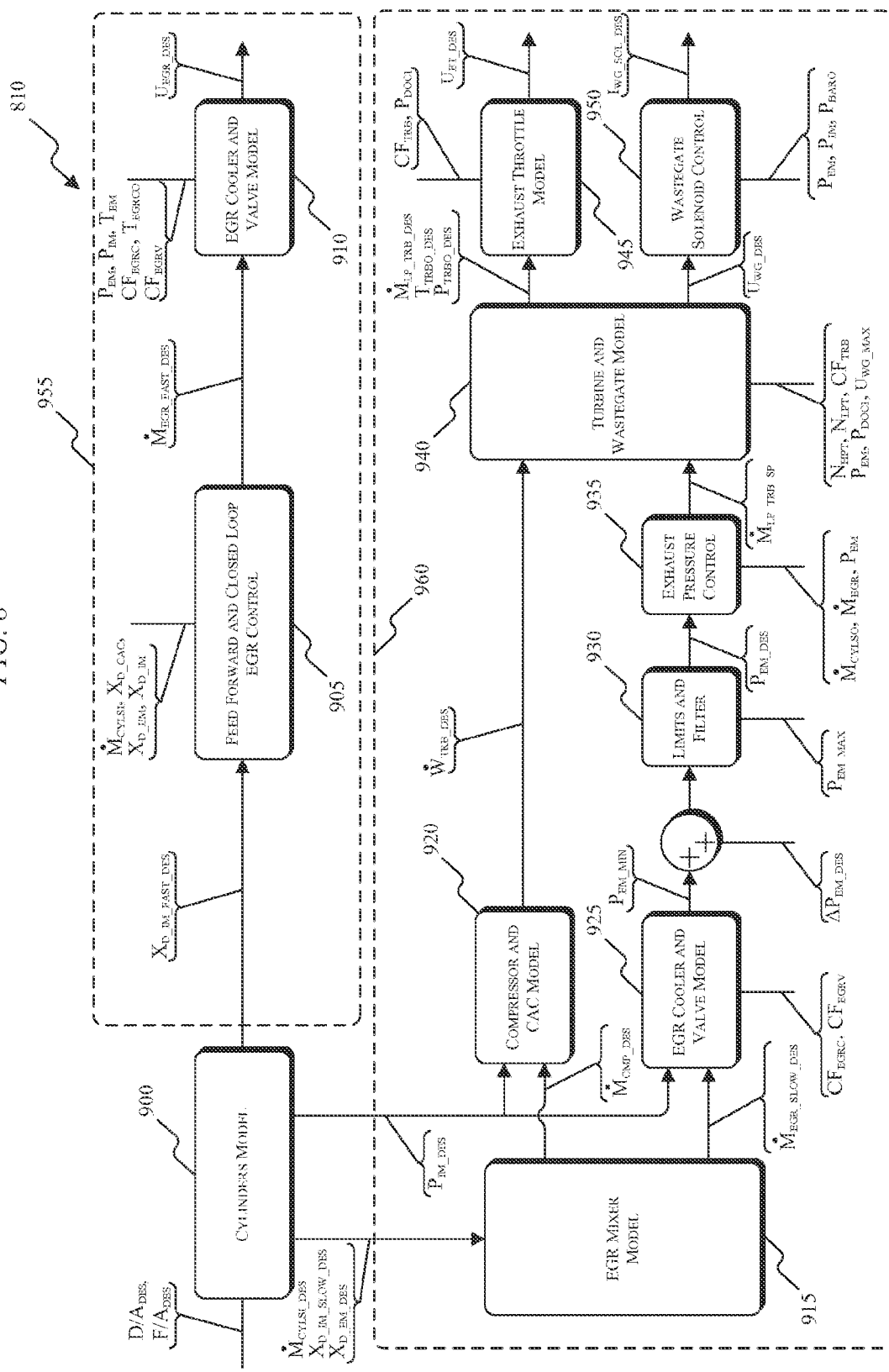
FIG. 8 illustrates an inverse engine model and control system.

The inverse engine module 810 of FIG. 7 is illustrated in more detail in FIG. 8. The inverse engine module 810 includes a cylinders model module 900, a feed forward and closed loop EGR control module 905, an EGR cooler and Valve model module 910, an EGR mixer model module 915, a compressor and CAC model module 920, an EGR cooler and valve model module 925, a limits and filter module 930 and exhaust pressure control module 935, a turbine and wastegate model module 940, an exhaust throttle model module 945, and a wastegate solenoid control module 950.

The inverse engine module 810 is divided into two primary control portions: an EGR control portion 955; and an exhaust throttle and wastegate control portion 960 (i.e., a turbocharger control portion). The cylinders model module 900 receives the desired diluent-to-air ratio, $D/A_{des}$, and the desired fuel-to-air ration, $F/A_{des}$. The cylinders model 900 outputs a desired intake manifold diluent mass fraction for fast control $\chi_{d\_im\_fast\_des}$, to the feed forward and closed loop EGR control module 905. The desired intake manifold diluent mass fraction for fast control $\chi_{d\_im\_fast\_des}$, is calculated by the cylinders model module 900 and using EQNS. 31-33. A desired cylinder diluent mass for fast control, $m_{d\_cyl\_fast\_des}$ (i.e., EGR valve control), is equal to the desired diluent-to-air ratio, $D/A_{des}$, multiplied by a cylinder air mass, $m_{a\_cyl}$, as shown below in EQN. 31:

$$m_{d\_cyl\_fast\_des} = D/A_{des} \cdot m_{a\_cyl} \qquad \text{EQN. 31}$$

A desired cylinder-in diluent mass for fast control, $m_{d\_cyli\_fast\_des}$, is equal to the desired cylinder diluent mass for fast control, $m_{d\_cyl\_fast\_des}$, minus a cylinder residual diluent mass, $m_{d\_res}$, as shown below in EQN. 32:

$$m_{d\_cyli\_fast\_des} = m_{d\_cyl\_fast\_des} - m_{d\_res} \qquad \text{EQN. 32}$$

The desired intake manifold diluent mass fraction for fast control, $\chi m_{d\_im\_fast\_des}$, is then equal to the desired cylinder in diluent mass for fast control, $m_{d\_cyli\_fast\_des}$, divided by a cylinder in mass estimate, $m_{cycli}$, as shown below in EQN. 33:

$$\chi_{d\_im\_fast\_des} = \frac{m_{d\_cyli\_fast\_des}}{m_{cyli}} \qquad \text{EQN. 33}$$

The feed forward and closed loop EGR control module 905 receives the desired intake manifold diluent mass fraction for fast control $\chi_{d\_im\_fast\_des}$, a mass flow into the engine cylinders, $\dot{m}_{cylsi}$, a CAC diluent mass fraction, $\chi_{d\_cac}$, an exhaust manifold diluent mass fraction, $\chi_{d\_em}$, and an intake manifold diluent mass fraction, $\chi_{d\_im}$.

A desired intake manifold EGR mass fraction for fast control, $\chi_{egr\_im\_fast\_des}$ (i.e., EGR valve control), is calculated by taking the difference between the desired intake manifold diluent mass fraction for fast control $\chi_{d\_im\_fast\_des}$ and a CAC diluent mass fraction estimate, $\chi_{d\_cac}$, and then dividing by a difference between the exhaust manifold diluent mass fraction, $\chi_{d\_em}$, and the CAC diluent mass fraction, $\chi_{d\_cac}$, as shown below in EQN. 34. The CAC diluent mass fraction, $\chi_{d\_cac}$, will be non-zero when there is humidity in the ambient air. The CAC diluent mass fraction is calculated using a humidity measurement from the humidity sensor 635 at the low pressure compressor inlet.

$$\chi_{egr\_im\_fast\_des} = \frac{\chi_{d\_im\_fast\_des} - \chi_{d\_cac}}{\chi_{d\_em} - \chi_{d\_cac}} \qquad \text{EQN. 34}$$

A feed forward EGR mass flow, $\dot{m}_{egr\_ff}$, is calculated by multiplying the mass flow into cylinders, $\dot{m}_{cylsi}$, by the desired intake manifold EGR mass fraction for fast control, $\chi_{egr\_im\_fast\_des}$, as shown below in EQN. 35:

$$\dot{m}_{egr\_ff} = \dot{m}_{cylsi} \cdot \chi_{egr\_im\_fast\_des} \qquad \text{EQN.35}$$

A closed loop EGR mass flow, $\dot{m}_{egr\_cl}$, is calculated by multiplying an EGR mass flow proportional gain, $K_{p\_egr}$, by the difference between the desired intake manifold diluent mass fraction for fast control $\chi_{d\_im\_fast\_des}$, and the intake manifold diluent mass fraction, $\chi_{d\_im}$, as shown below in EQN. 36:

$$\dot{m}_{egr\_cl} = K_{p\_egr} \cdot (\chi_{d\_im\_fast\_des} - \chi_{d\_im}) \qquad \text{EQN.36}$$

A desired EGR mass flow for fast control, $\dot{m}_{egr\_fast\_des}$, is equal to the sum of the feed forward EGR mass flow, $\dot{m}_{egr\_ff}$, and closed loop EGR mass flow, $\dot{m}_{egr\_cl}$, as shown below in EQN. 37:

$$\dot{m}_{egr\_fast\_des} = \dot{m}_{egr\_ff} + \dot{m}_{egr\_cl} \qquad \text{EQN. 37}$$

The desired EGR mass flow for fast control, $\dot{m}_{egr\_fast\_des}$, is output to the EGR cooler and valve model module 910. The EGR cooler and valve model module 910 also receives an exhaust manifold pressure, $P_{em}$, an intake manifold pressure, $P_{im}$, an exhaust manifold temperature, $T_{em}$, the EGR cooler mass flow correction factor, $CF_{egrc}$, the EGR valve mass flow correction factor, $CF_{egrv}$, and an EGR cooler outlet temperature, $T_{egrco}$.

A desired EGR valve position, $U_{egr\_des}$, is then determined using EQNS. 25 and 26. EQN. 25 is used to find a desired EGR cooler outlet pressure that provides flow equal to the desired EGR mass flow for fast control, $\dot{m}_{egr\_fast\_des}$ (e.g., using an iterative solving process). EQN. 26 is then used to find the desired EGR valve position, $U_{egr\_des}$, that provides flow equal to the desired EGR mass flow for fast control, $\dot{m}_{egr\_fast\_des}$, with desired EGR cooler outlet pressure, $P_{egrco\_des}$.

The cylinders model 900 also outputs a desired cylinder in mass, $\dot{m}_{cylsi\_des}$, a desired intake manifold diluent mass fraction for slow control, $\chi_{d\_im\_slow\_des}$, and a desired exhaust manifold diluent mass fraction, $\chi_{d\_em\_des}$, to the EGR mixer module 915.

A desired cylinder air mass, $m_{a\_cyl\_des}$, is equal to a fuel mass injected into a cylinder, $m_f$, divided by a desired fuel to air ratio, $F/A_{des}$, as shown below in EQN. 38:

$$m_{a\_cyl\_des} = \frac{m_f}{F/A_{des}} \qquad \text{EQN. 38}$$

A cylinder in air mass estimate, $m_{a\_cyl\_des}$, is equal to the desired cylinder air mass, $m_{a\_cyl\_des}$, minus the previous cylinder residual air mass estimate, $m_{a\_res\_previous}$, as shown below in EQN. 39:

$$m_{a\_cyli\_des} = m_{a\_cyl\_des} - m_{a\_res\_previous} \qquad \text{EQN. 39}$$

A desired cylinder diluent mass for slow control, $m_{d\_cyl\_slow\_des}$ (i.e., wastegate and exhaust throttle control), is equal to the desired diluent-to-air ratio, $D/A_{des}$, multiplied by the desired cylinder air mass, $m_{a\_cyl\_des}$, as shown below in EQN. 40.

$$m_{d\_cyl\_slow\_des} = D/A_{des} \cdot m_{a\_cyl\_des} \qquad \text{EQN. 40}$$

A desired cylinder in diluent mass for slow control, $m_{d\_cyli\_slow\_des}$, is equal to the desired cylinder diluent mass for slow control, $m_{d\_cyl\_slow\_des}$, minus the previous cylinder residual diluent mass estimate, $m_{d\_res\_previous}$, as shown below in EQN. 41:

$$m_{d\_cyli\_slow\_des} = m_{d\_cyl\_slow\_des} - m_{d\_res\_previous} \qquad \text{EQN. 41}$$

A desired cylinder in mass, $m_{cyli\_des}$, is equal to the desired cylinder in air mass, $m_{a\_cyli\_des}$, plus the desired cylinder in diluent mass for slow control, $m_{d\_cyl\_slow\_des}$, as shown below in EQN. 42:

$$m_{cyli\_des} = m_{a\_cyli\_des} + m_{d\_cyli\_slow\_des} \qquad \text{EQN. 42}$$

The desired mass flow into the cylinders, $\dot{m}_{cylsi\_des}$, is then calculated using engine speed, $N_e$, the number of engine cylinders, $n_{cyls}$, and the desired cylinder in mass, $m_{cyli\_des}$, as shown below in EQN. 43:

$$\dot{m}_{cylsi\_des} = \frac{N_e \cdot n_{cyls} \cdot m_{cyli\_des}}{(2 \text{ rev/cycle}) \cdot (60 \text{ min/sec})} \quad \text{EQN. 43}$$

The desired intake manifold pressure, $P_{im\_des}$, is equal to the desired cylinder in mass, $m_{cyli\_des}$, multiplied by the ideal gas constant, R, multiplied by an intake manifold temperature, $T_{im}$, divided by a cylinder displacement volume, $V_{cyl\_disp}$, and volumetric efficiency, VE, as shown below in EQN. 44:

$$P_{im\_des} = \frac{m_{cyli\_des} \cdot R \cdot T_{im}}{V_{cyl\_disp} \cdot VE} \quad \text{EQN. 44}$$

The desired intake manifold diluent mass fraction for slow control, $\chi_{d\_im\_slow\_des}$, is equal to the desired cylinder in diluent mass for slow control, $m_{d\_cyli\_slow\_des}$, divided by cylinder in mass estimate, $m_{cyli\_des}$, as shown below in EQN. 45:

$$\chi_{d\_im\_slow\_des} = \frac{m_{d\_cyli\_slow\_des}}{m_{cyli\_des}} \quad \text{EQN. 45}$$

The desired exhaust manifold diluent mass fraction $\chi_{d\_em\_des}$, is determined using EQNS. 46-48. A desired cylinder mass when the exhaust valve opens, $m_{cyl\_evo\_des}$, is equal to the desired cylinder air mass, $m_{a\_cyl\_des}$, plus the desired cylinder diluent mass for slow control, $m_{d\_cyl\_slow\_des}$, plus a fuel mass injected into the cylinder, $m_f$, as shown below in EQN. 46:

$$m_{cyl\_evo\_des} = m_{a\_cyl\_des} + m_{d\_cyl\_slow\_des} + m_f \quad \text{EQN. 46}$$

A desired cylinder diluent mass when the exhaust valve opens, $m_{d\_cyl\_evo\_des}$, is equal to the desired cylinder diluent mass for slow control, $m_{d\_cyl\_slow\_des}$, plus fuel mass injected into the cylinder, $m_f$, multiplied by the quantity one plus one over the Stoichiometric fuel-to-air ratio, $F/A_{stoich}$, as shown below in EQN. 47:

$$m_{d\_cyl\_evo\_des} = m_{d\_cyl\_slow\_des} + m_f\left(1 + \frac{1}{F/A_{stoich}}\right) \quad \text{EQN. 47}$$

The desired exhaust manifold diluent mass fraction, $\chi_{d\_em\_des}$, is then equal to the desired cylinder diluent mass when the exhaust valve opens, $m_{d\_cyl\_evo\_des}$, divided by the desired cylinder mass when the exhaust valve opens, $m_{cyl\_evo\_des}$, as shown below in EQN. 48:

$$\chi_{d\_em\_des} = \frac{m_{d\_cyl\_evo\_des}}{m_{cyl\_evo\_des}} \quad \text{EQN. 48}$$

The EGR mixer module 915 receives the desired cylinder in mass flow, $\dot{m}_{cylsi\_des}$, the desired intake manifold diluent mass fraction for slow control, $\chi_{d\_im\_slow\_des}$, and the desired exhaust manifold diluent mass fraction, $\chi_{d\_em\_des}$. The EGR mixer module 915 generates a desired compressor mass flow, $\dot{m}_{cmp\_des}$, and a desired EGR mass flow for slow control, $\dot{m}_{egr\_slow\_des}$.

A desired intake manifold EGR mass fraction for slow control, $\chi_{egr\_im\_slow\_des}$ (i.e., for wastegate and exhaust throttle control), is calculated by taking the difference between the desired intake manifold diluent mass fraction for slow control, $\chi_{d\_im\_slow\_des}$, and the CAC diluent mass fraction, $\chi_{d\_cac}$, and then dividing by the difference between the desired exhaust manifold diluent mass fraction, $\chi_{d\_em\_des}$, and the CAC diluent mass fraction, $\chi_{d\_cac}$, as shown below in EQN. 49:

$$\chi_{egr\_im\_slow\_des} = \frac{\chi_{d\_im\_slow\_des} - \chi_{d\_cac}}{\chi_{d\_em\_des} - \chi_{d\_cac}} \quad \text{EQN. 49}$$

The desired EGR mass flow for slow control, $\dot{m}_{egr\_slow\_des}$, is then equal to the desired mass flow into cylinders, $\dot{m}_{cylsi\_des}$, multiplied by the desired intake manifold EGR mass fraction for slow control, $\chi_{egr\_im\_slow\_des}$, as shown below in EQN. 50:

$$\dot{m}_{egr\_slow\_des} = \dot{m}_{cylsi\_des} \chi_{egr\_im\_slow\_des} \quad \text{EQN. 50}$$

The desired compressor mass flow, $\dot{m}_{cmp\_des}$, is equal to the difference between the desired mass flow into cylinders, $\dot{m}_{cylsi\_des}$, and the desired EGR mass flow for slow control, $\dot{m}_{egr\_slow\_des}$, as shown below in EQN. 51:

$$\dot{m}_{cmp\_des} = \dot{m}_{cylsi\_des} - \dot{m}_{egr\_slow\_des} \quad \text{EQN. 51}$$

The compressor and CAC model module 920 receives the desired compressor mass flow, $\dot{m}_{cmp\_des}$, as well as the desired intake manifold pressure, $P_{im\_des}$. The compressor and CAC models are used to determine how much power, $\dot{W}_{trb\_des}$, is required to achieve the desired compressor mass flow, $\dot{m}_{cmp\_des}$, with the desired intake manifold pressure, $P_{im\_des}$. To determine the pressure drop across the CAC 645, a compressor outlet pressure, $P_{cmpo}$, and intake manifold pressure, $P_{im}$, are measured or calculated from mass and temperature state estimates using the ideal gas law.

The compressor outlet pressure, $P_{cmpo}$, is equal to the CAC mass, $m_{cac}$, multiplied by the ideal gas constant, R, multiplied by the average temperature of the CAC (i.e., the sum of compressor outlet temperature, $T_{cmpo}$, and CAC outlet temperature, $T_{caco}$, divided by two), all divided by the CAC volume, $V_{cac}$, as shown below in EQN. 52:

$$P_{cmpo} = \frac{m_{cac} \cdot R}{V_{cac}} \cdot \left(\frac{T_{cmpo} + T_{caco}}{2}\right) \quad \text{EQN. 52}$$

The intake manifold pressure, $P_{im}$, is equal to the intake manifold mass, $m_{im}$, multiplied by the ideal gas constant, R, multiplied by the intake manifold temperature, $T_{im}$, divided by the intake manifold volume, $V_{im}$, as shown below in EQN. 53:

$$P_{im} = \frac{m_{im} \cdot R \cdot T_{im}}{V_{im}} \quad \text{EQN. 53}$$

A desired compressor outlet pressure, $P_{cmpo\_des}$, is equal to the desired intake manifold pressure, $P_{im\_des}$, plus the compressor outlet pressure, $P_{cmpo}$, minus the intake manifold pressure, $P_{im}$, as shown below in EQN. 54:

$$P_{cmpo\_des} = P_{im\_des} + (P_{cmpo} - P_{im}) \quad \text{EQN. 54}$$

The compressor outlet pressure, $P_{cmpo}$, and intake manifold pressure, $P_{im}$, were previously calculated for the air system state observer and control system 405, so they can conveniently be used in EQN. 54. Some error can be introduced when calculating desired compressor outlet pressure, $P_{cmpo\_des}$, in this way under transient conditions because the pressure drop across the CAC 645 is for a present flow instead of a desired flow. In some embodiments, EQN. 24 is used to solve for the CAC pressure drop at the desired compressor mass flow, $\dot{m}_{cmp\_des}$. EQN. 24 would produce a more accurate calculation, but would involve an iterative solution.

A desired compressor interstage pressure, $P_{cmp\_inter\_des}$, is determined using a current compressor interstage pressure, $P_{cmp\_inter}$, and current compressor outlet pressure, $P_{cmpo}$. An interpolation factor is calculated using the current pressures, and the desired compressor interstage pressure, $P_{cmp\_inter\_des}$, is calculated to be the same fractional distance between the compressor inlet pressure, $P_{cmpi}$, and the desired compressor outlet pressure, $P_{cmpo\_des}$, as shown below in EQN. 55:

$$P_{cmp\_inter\_des} = P_{cmpi} + \left( \frac{P_{cmp\_inter} - P_{cmpi}}{P_{cmpo} - P_{cmpi}} \right) \cdot (P_{cmpo\_des} - P_{cmpi}) \quad \text{EQN. 55}$$

A desired high pressure compressor pressure ratio, $r_{p\_hp\_cmp\_des}$, is equal to the desired compressor outlet pressure, $P_{cmpo\_des}$, divided by the desired compressor interstage pressure, $P_{cmp\_inter\_des}$, as shown below in EQN. 56:

$$r_{p\_hp\_cmp\_des} = \frac{P_{cmpo\_des}}{P_{cmp\_inter\_des}} \quad \text{EQN. 56}$$

A desired low pressure compressor pressure ratio, $r_{p\_lp\_cmp\_des}$, is equal to the desired compressor interstage pressure, $P_{cmp\_inter\_des}$, divided by the compressor inlet pressure, $P_{cmpi}$, as shown below in EQN. 57:

$$r_{p\_lp\_cmp\_des} = \frac{P_{cmp\_inter\_des}}{P_{cmpi}} \quad \text{EQN. 57}$$

A desired high pressure compressor delta temperature, $\Delta T_{hp\_cmp\_des}$, is calculated using the ratio of specific heats, k, and a high pressure compressor efficiency, $\varepsilon_{hp\_cmp}$, as shown below in EQN. 58. The efficiency, $\varepsilon_{hp\_cmp}$, is determined in the air system state observer and control system 405 using a compressor efficiency map. The map is a table lookup with corrected turbo speed on one axis and pressure ratio of the other axis. The efficiency is determined using the current pressure ratio instead of the desired pressure ratio.

$$\Delta T_{hp\_cmp\_des} = \frac{r_{p\_hp\_cmp\_des}^{(k-1)/k} - 1}{\varepsilon_{hp\_cmp}} \quad \text{EQN. 58}$$

A desired low pressure compressor delta temperature, $\Delta T_{lp\_cmp\_des}$, is calculated using the ratio of specific heats and a low pressure compressor efficiency, $\varepsilon_{lp\_cmp}$, as shown below in EQN. 59:

$$\Delta T_{lp\_cmp\_des} = \frac{r_{p\_lp\_cmp\_des}^{(k-1)/k} - 1}{\varepsilon_{lp\_cmp}} \quad \text{EQN. 59}$$

A desired compressor power, $\dot{W}_{cmp\_des}$, is equal to the desired compressor mass flow, $\dot{m}_{cmp\_des}$, multiplied by the specific heat at constant pressure, $C_p$, multiplied by the desired low pressure compressor delta temperature, $\Delta T_{lp\_cmp}$, plus the desired high pressure compressor delta temperature, $\Delta T_{hp\_cmp}$, as shown below in EQN. 60:

$$\dot{W}_{cmp\_des} = \dot{m}_{cmp\_des} \cdot C_p \cdot (\Delta T_{lp\_cmp} + \Delta T_{hp\_cmp}) \quad \text{EQN. 60}$$

The desired turbine power, $\dot{W}_{trb\_des}$, is set equal to the desired compressor power, $\dot{W}_{cmp\_des}$, as shown below in EQN. 61.

$$\dot{W}_{trb\_des} = \dot{W}_{cmp\_des}, \quad \text{EQN. 61}$$

It should be noted that, although EQN. 61 appears to indicate no mechanical losses, mechanical losses were previously accounted for in the turbine efficiency maps used in EQNS. 58 and 59.

The EGR cooler and valve model module 925 receives the desired EGR mass flow for slow control, $\dot{m}_{egr\_slow\_des}$, as well as the desired intake manifold pressure, $P_{im\_des}$, an EGR cooler mass flow correction factor, $CF_{egrc}$, and an EGR valve mass flow correction factor, $CF_{egrv}$. An exhaust manifold pressure minimum, $P_{em\_min}$, to achieve the desired EGR mass flow for slow control, $\dot{m}_{egr\_slow\_des}$, is determined using EQNS. 25 and 26. EQN. 26 is used to find the desired EGR cooler outlet pressure, $P_{egrco\_des}$, that provides flow equal to the desired EGR mass flow for slow control, $\dot{m}_{egr\_slow\_des}$. This calculation is done with the EGR valve position at its maximum, or slightly below the maximum to provide some reserve for control. In some embodiments, an iterative process can be used to find the solution. EQN. 25 is then used to find the exhaust manifold pressure minimum, $P_{em\_min}$. In some embodiments, an iterative process can also be used to find this solution.

A desired exhaust manifold pressure, $P_{em\_des}$, is then calculated by adding the exhaust manifold pressure minimum, $P_{em\_min}$, and desired exhaust manifold pressure offset, $\Delta P_{em\_des}$, the result of which is limited to the exhaust manifold pressure maximum, $P_{em\_max}$, as shown below in EQN. 62. The exhaust manifold pressure maximum, $P_{em\_max}$, is a calculated parameter that provides protection from high exhaust manifold pressure, as well as high engine delta pressure. High exhaust manifold pressure may cause damage to gaskets, seals, and the EGR cooler 665. Engine delta pressure is the difference between intake manifold pressure and exhaust manifold pressure. If the exhaust manifold pressure exceeds the intake manifold pressure by a large amount, the exhaust valves may be pushed open during the intake stroke of the engine 250. Such a condition may affect combustion and could damage the engine and should be avoided.

$$P_{em\_des} = \text{minimum}(P_{em\_min} + \Delta P_{em\_des}, P_{em\_max}) \quad \text{EQN. 62}$$

In some embodiments, it is desirable to filter the desired exhaust manifold pressure, $P_{em\_des}$, to reduce actuator movement. A first order filter similar to that provided below in EQN. 75 can be used.

The desired exhaust manifold pressure, $P_{em\_des}$, is provided to the exhaust pressure control module 935. The exhaust pressure control module 935 also receives the mass flow out of cylinders, $\dot{m}_{cylso}$, the EGR mass flow, $\dot{m}_{egr}$, and the exhaust manifold pressure, $P_{em}$.

A feed forward low pressure turbine mass flow, $\dot{m}_{lp\_trb\_ff}$, is equal to the mass flow out of cylinders, $\dot{m}_{cylso}$, minus the EGR mass flow, $\dot{m}_{egr}$, as shown below in EQN. 63:

$$\dot{m}_{lp\_trb\_ff} = \dot{m}_{cylso} - \dot{m}_{egr} \qquad \text{EQN. 63}$$

A closed loop low pressure turbine mass flow, $\dot{m}_{lp\_trb\_cl}$, is equal to an exhaust manifold pressure proportional gain, $K_{p\_em}$, multiplied by the difference between the desired exhaust manifold pressure, $P_{em\_des}$ and the exhaust manifold pressure, $P_{em}$, as shown below in EQN. 64:

$$\dot{m}_{lp\_trb\_cl} = K_{p\_em} \cdot (P_{em} - P_{em\_des}) \qquad \text{EQN. 64}$$

A low pressure turbine mass flow setpoint, $\dot{m}_{lp\_trb\_sp}$, is then equal to the sum of the feed forward low pressure turbine mass flow, $\dot{m}_{lp\_trb\_ff}$, and the closed loop low pressure turbine mass flow, $\dot{m}_{lp\_trb\_cl}$, as shown below in EQN. 65:

$$\dot{m}_{lp\_trb\_sp} = \dot{m}_{lp\_trb\_ff} + \dot{m}_{lp\_trb\_cl} \qquad \text{EQN. 65}$$

The term "setpoint" is used as opposed to the term "desired" in EQN. 65 because a subsequent control step in the turbine and wastegate model module 940 determines a desired mass flow that is achievable and as close as possible to the setpoint of EQN. 65.

The turbine and wastegate model module 940 receives the low pressure turbine mass flow setpoint, $\dot{m}_{lp\_trb\_sp}$, and the desired turbine power, $\dot{W}_{trb\_des}$, as well as a variety of other parameters. The turbine and wastegate model module 940 is used to determine a desired low pressure turbine mass flow, $\dot{m}_{lp\_trb\_des}$, a desired turbine outlet pressure, $P_{trbo\_des}$, a desired turbine outlet temperature, $T_{trbo\_des}$, and a desired wastegate position, $u_{wg\_des}$. Turbine mass flow and efficiency are determined using turbine maps, temperature change across the turbine is calculated using the pressure ratio and efficiency, power is calculated using mass flow and temperature change, and wastegate mass flow is determined using EQN. 29. A three-dimensional search is used to find the states that provide the desired turbine power, $\dot{W}_{trb\_des}$, and achieve the low pressure turbine mass flow setpoint, $\dot{m}_{lp\_trb\_sp}$.

The first level of the search evaluates different desired turbine outlet pressures, $P_{trbo\_des}$ with the goal of achieving the desired turbine power, $\dot{W}_{trb\_des}$. The first level of the search is shown in and described with respect to a process 1000 in FIG. 9. During each iteration of the process 1000, a second level search is performed to evaluate different desired wastegate positions, $u_{wg\_des}$, with the goal of achieving the desired low pressure turbine mass flow, $\dot{m}_{lp\_trb\_des}$. The second level of the search is shown in and described with respect to a process 1100 in FIG. 10. During each iteration of the process 1100, a third level search is performed to evaluate different turbine interstage pressures, $P_{trb\_inter}$, with the goal of achieving a low pressure turbine mass flow, $\dot{m}_{lp\_trb}$, equal to the sum of a high pressure turbine mass flow, $\dot{m}_{hp\_trb}$, and wastegate mass flow, $\dot{m}_{wg}$. During the third level search, the turbine maps are used to determine mass flow, efficiency, temperature, and power. The third level search applies to two-stage turbochargers. With a single turbocharge, these calculations would be performed once for each turbine outlet pressure and wastegate valve position combination. The third level of the search is shown in and described with respect to a process 1200 in FIG. 11.

Figure 9:
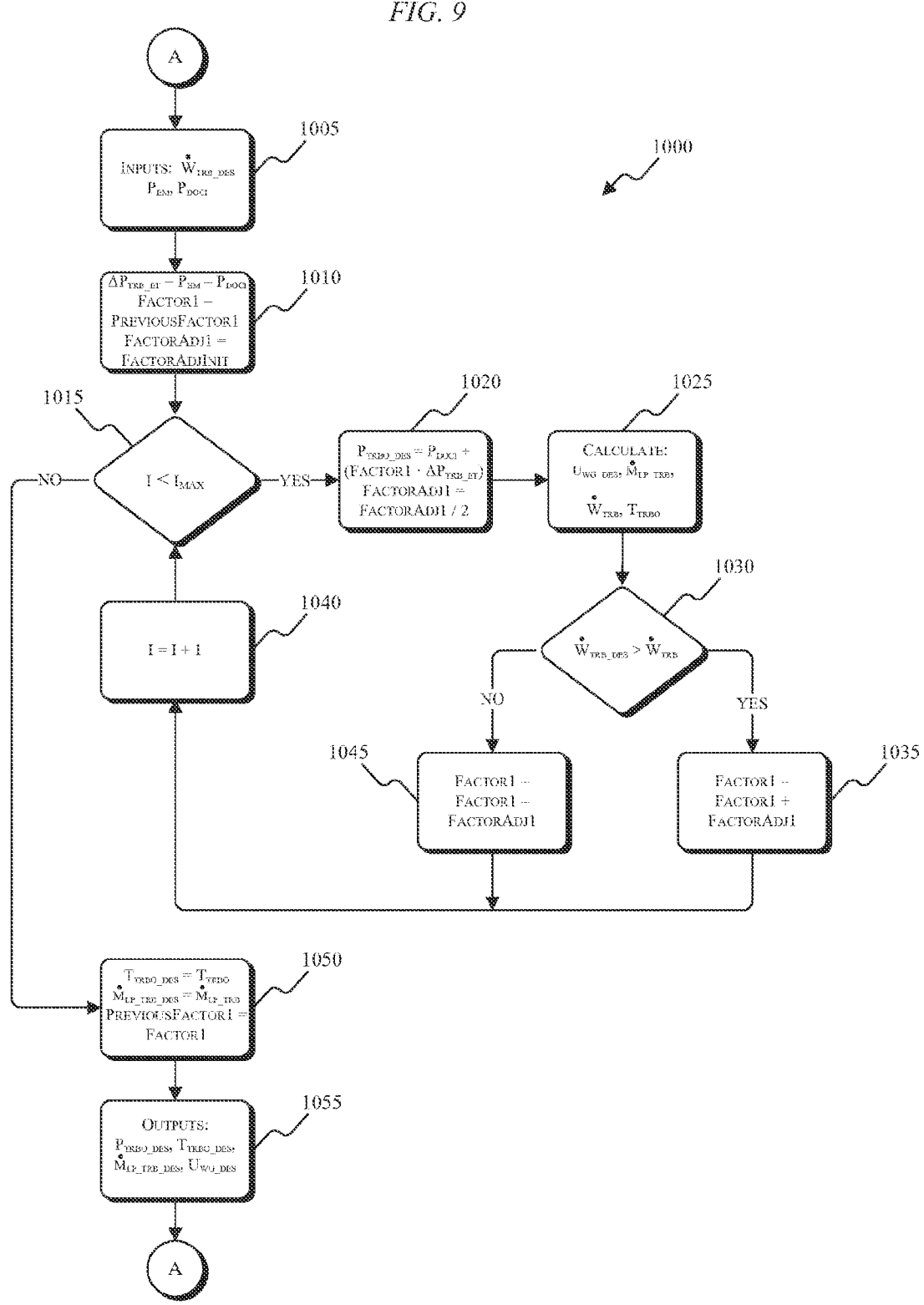
FIG. 9 is an iterative searching process for determining turbine outlet pressure.

The process 1000 of FIG. 9 begins with receiving the desired turbine power, $\dot{W}_{trb\_des}$, the exhaust manifold pressure, $P_{em}$, and the DOC inlet pressure, $P_{doci}$, at step 1005. In some embodiments, an after-treatment system inlet pressure is used. At step 1010, a delta pressure across the turbine and the exhaust throttle, $\Delta P_{trb\_et}$, is calculated as the difference between the exhaust manifold pressure, $P_{em}$, and the DOC inlet pressure, $P_{doci}$, as shown below in EQN. 66:

$$\Delta P_{trb\_et} = P_{em} - P_{doci} \qquad \text{EQN. 66}$$

Also at step 1010, a first factor, Factor1, and a factor adjustment, FactorAdj1, are respectively set to the values for the previous Factor1, PreviousFactor1, and an initial factor adjustment, FactorAdjInit, for variable i=0. At step 1015, the variable, i, is compared to a maximum value for the variable, $i_{max}$, which corresponds to a number of iterations for the search. If the variable, i, is less than $i_{max}$, the process 1000 proceeds to step 1020.

At step 1020, a desired turbine output pressure, $P_{trbo\_des}$, is calculated as the sum of the DOC inlet pressure, $P_{doci}$, and the product of Factor1 and the delta pressure across the turbine and the exhaust throttle, $\Delta P_{trb\_et}$, A as shown below in EQN. 67:

$$P_{trb\_des} = P_{doci} + (\text{Factor1} \cdot \Delta P_{trb\_et}) \qquad \text{EQN. 67}$$

At step 1020, FactorAdj1 is also reset to a value of FactorAdj1 divided by 2. At step 1025, a desired wastegate position, $u_{wg\_des}$, a low pressure turbine mass flow, $\dot{m}_{lp\_trb}$, a turbine power, $\dot{W}_{trb}$, and a turbine outlet temperature, $T_{trbo}$, are calculated, as is described in more detail below with respect to FIG. 10 and process 1100. At step 1030, the desired turbine power, $\dot{W}_{trb\_des}$, is compared to the turbine power, $\dot{W}_{trb}$, calculated in step 1025. If the desired turbine power, $\dot{W}_{trb\_des}$, is greater than the turbine power, $\dot{W}_{trb}$, the process 1000 proceeds to step 1035 where Factor1 is updated to a value of Factor1 plus FactorAdj1, and the variable, i, is updated to a value of i+1 (step 1040). If the desired turbine power, $\dot{W}_{trb\_des}$ is not greater than the turbine power, $\dot{W}_{trb}$, the process 1000 proceeds to step 1045 where Factor1 is updated to a value of Factor1 minus FactorAdj1, and the variable, i, is updated to a value of i+1 (step 1040). Steps 1015-1040 are repeated until the variable, i, is equal to $i_{max}$. When the variable, i, is equal to $i_{max}$ (i.e., no longer less than), the process proceeds to step 1050. At step 1050, the desired turbine outlet temperature, $T_{trbo\_des}$, is set to the calculated value of the turbine outlet temperature, $T_{trbo}$, the desired low pressure turbine mass flow, $\dot{m}_{lp\_trb\_des}$, is set to the value for the calculated low pressure turbine mass flow, $\dot{m}_{lp\_trb}$, and PreviousFactor1 is set equal to Factor1. The process 1000 then outputs the desired turbine outlet pressure, $P_{trbo\_des}$, the desired turbine outlet temperature, $T_{trbo\_des}$, the desired wastegate position, $u_{wg\_des}$, and the desired low pressure turbine mass flow, $\dot{m}_{lp\_trb\_des}$. The process 1000 can then be executed again by the ECU 200.

Figure 10:
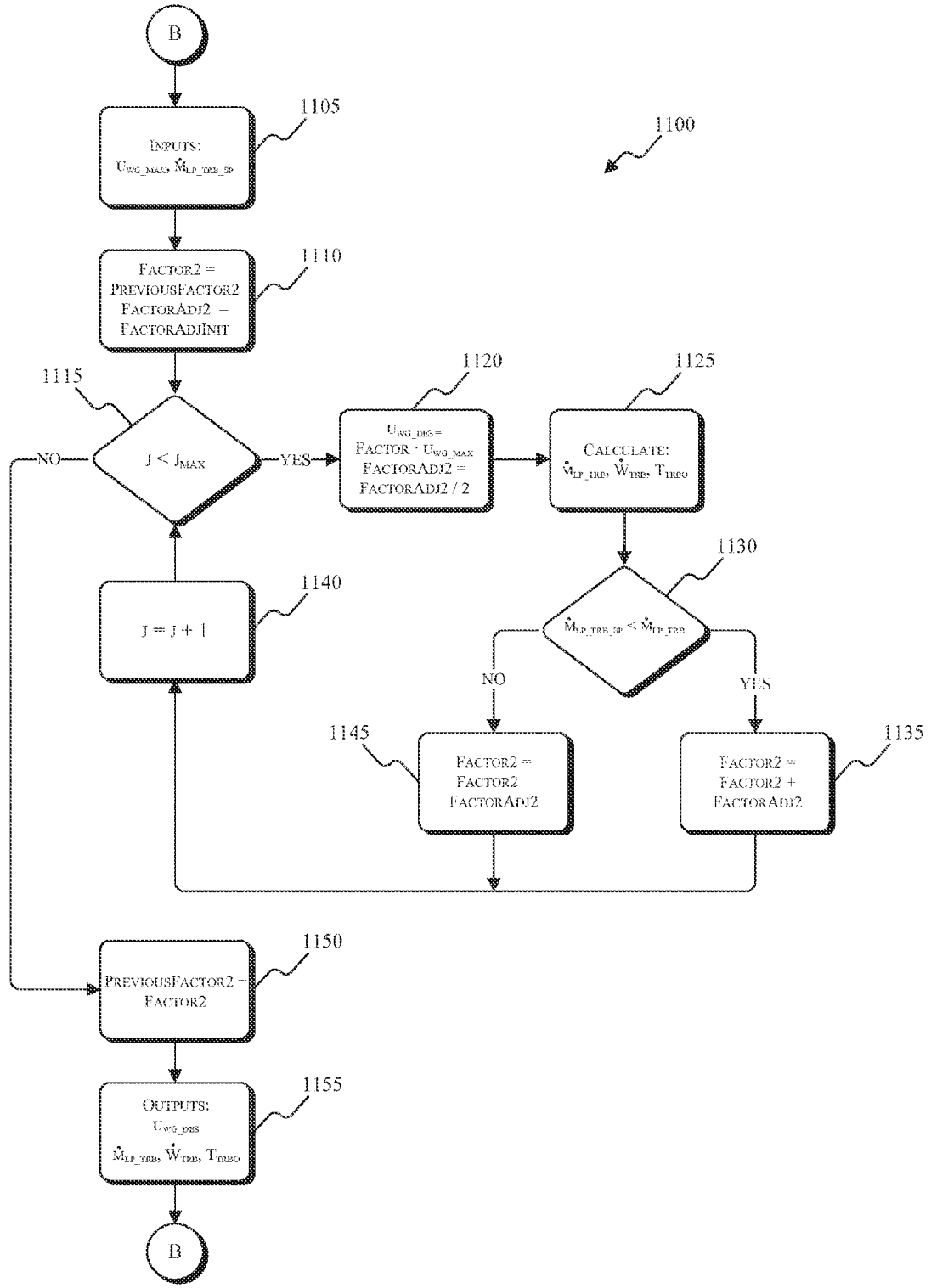
FIG. 10 is an iterative searching process for determining wastegate position.

The process 1100 of FIG. 10 begins with receiving the wastegate maximum position, $u_{wg\_max}$, and the low pressure turbine mass flow setpoint, $\dot{m}_{lp\_trb\_sp}$, at step 1105. At step 1110, a second factor, Factor2, and a second factor adjustment, FactorAdj2, are respectively set to the values for the previous Factor2, PreviousFactor2, and an initial factor adjustment, FactorAdjInit, for variable j=0. As step 1115, the variable, j, is compared to a maximum value for the variable, $j_{max}$, which corresponds to a number of iterations for the search. If the variable, j, is less than $j_{max}$, the process 1100 proceeds to step 1120.

At step 1120, a desired wastegate position, $u_{wg\_des}$, is calculated as the product of Factor2 and the wastegate maximum position, $u_{wg\_max}$, as shown below in EQN. 68:

$$u_{wg\_des} = \text{Factor2} \cdot u_{wg\_max} \qquad \text{EQN. 68}$$

At step 1120, FactorAdj2 is also reset to a value of FactorAdj2 divided by 2. At step 1125, a low pressure turbine mass flow, $\dot{m}_{lp\_trb}$, a turbine power, $\dot{W}_{trb}$, and a turbine outlet temperature, $T_{trbo}$, are calculated, as is described in more detail below with respect to FIG. 11 and process 1200. At step 1130, the low pressure turbine mass flow setpoint, $\dot{m}_{lp\_trb\_sp}$, is compared to the low pressure turbine mass flow, $\dot{m}_{lp\_trb}$, calculated in step 1125. If the low pressure turbine mass flow, $\dot{m}_{lp\_trb}$, is greater than the low pressure turbine mass flow setpoint, $\dot{m}_{lp\_trb\_sp}$, the process 1100 proceeds to step 1135 where Factor2 is updated to a value of Factor2 plus FactorAdj2, and the variable, j, is updated to a value of j+1 (step 1140). If the low pressure turbine mass flow, $\dot{m}_{lp\_trb}$, is not greater than the low pressure turbine mass flow setpoint, $\dot{m}_{lp\_trb\_sp}$, the process 1100 proceeds to step 1145 where Factor2 is updated to a value of Factor2 minus FactorAdj2, and the variable, j, is updated to a value of j+1 (step 1140). Steps 1115-1140 are repeated until the variable, j, is equal to $j_{max}$. When the variable, j, is equal to $j_{max}$ (i.e., no longer less than), the process proceeds to step 1150. At step 1150, PreviousFactor2 is set equal to Factor2. The process 1100 then outputs the turbine outlet temperature, $T_{trbo}$, the desired wastegate position, $u_{wg\_des}$, the low pressure turbine mass flow, $\dot{m}_{lp\_trb}$, and the turbine power, $\dot{W}_{trb}$. The process 1100 can then be executed again by the ECU 200.

Figure 11:
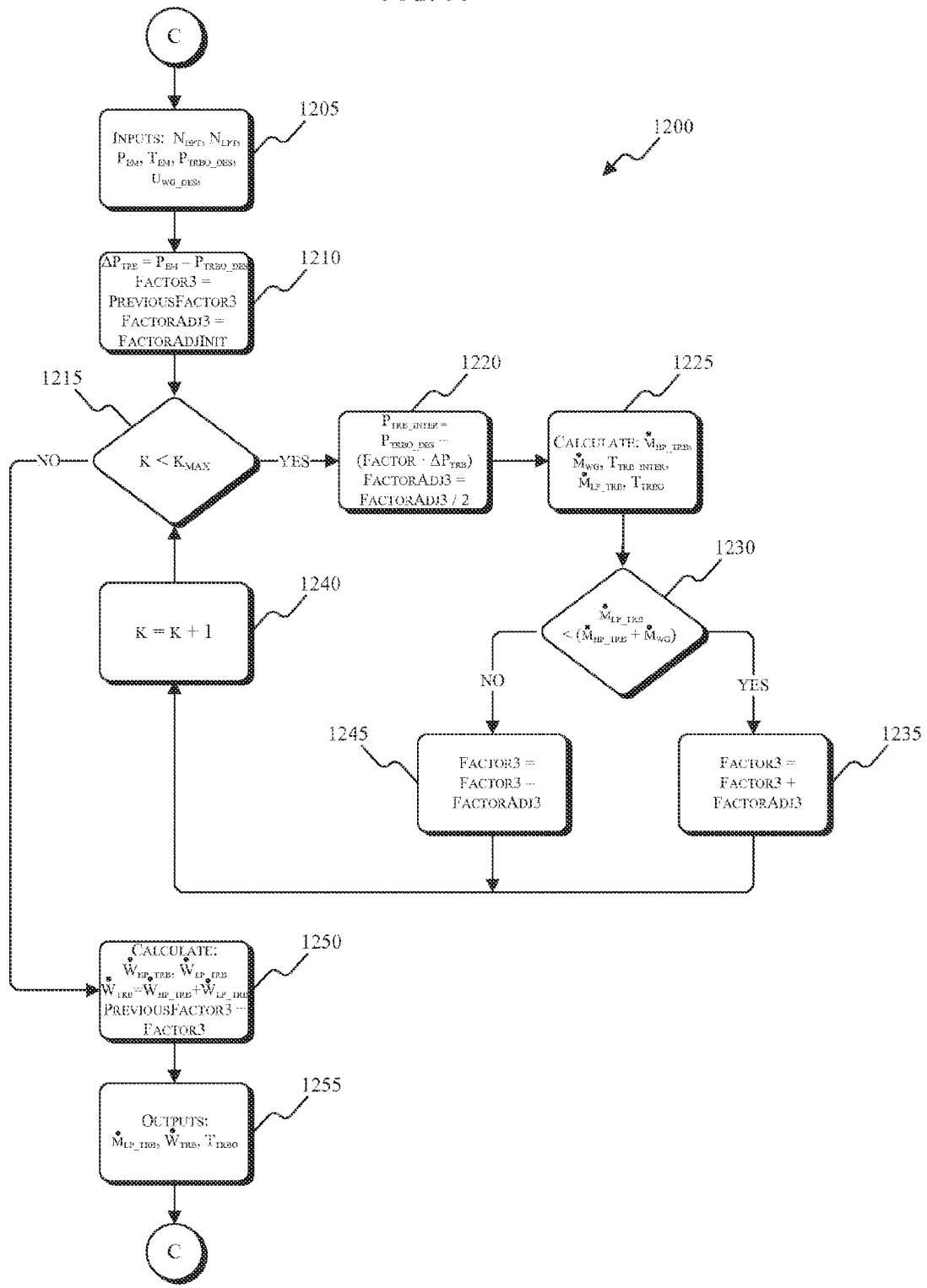
FIG. 11 is an iterative searching process for determining turbine interstage pressure.

The process 1200 of FIG. 11 begins with receiving a high pressure turbocharge speed, $N_{hpt}$, a low pressure turbocharge speed, $N_{lpt}$, the exhaust manifold pressure, $P_{em}$, the exhaust manifold temperature, $T_{em}$, the desired turbine outlet pressure, $P_{trbo\_des}$, and the desired wastegate position, $u_{wg\_des}$, at step 1205. At step 1210, a delta turbine pressure, $\Delta P_{trb}$, is calculated as the difference between the exhaust manifold pressure, $P_{em}$, and the desired turbine outlet pressure, $P_{trbo\_des}$, as shown below in EQN. 69:

$$\Delta P_{trb} = P_{em} - P_{trbo\_des} \qquad \text{EQN. 69}$$

At step 1210, a third factor, Factor3, and a third factor adjustment, FactorAdj3, are respectively set to the values for the previous Factor3, PreviousFactor3, and an initial factor adjustment, FactorAdjInit, for variable k=0. As step 1215, the variable, k, is compared to a maximum value for the variable, $k_{max}$, which corresponds to a number of iterations for the search. If the variable, k, is less than $k_{max}$, the process 1200 proceeds to step 1220.

At step 1220, an interstage turbine pressure, $P_{trb\_inter}$ is calculated as the sum of the desired turbine outlet pressure, $P_{trbo\_des}$, and the product of Factor3 and the delta turbine pressure, $\Delta P_{trb}$, as shown below in EQN. 70:

$$P_{trb\_inter} = P_{trbo\_des} + (\text{Factor3} \cdot \Delta P_{trb}) \qquad \text{EQN. 70}$$

At step 1220, FactorAdj3 is also reset to a value of FactorAdj3 divided by 2. At step 1225, a low pressure turbine mass flow, $\dot{m}_{lp\_trb}$, a high pressure turbine mass flow, $\dot{m}_{hp\_trb}$, a turbine outlet temperature, $T_{trbo}$, an interstage turbine temperature, $T_{trb\_inter}$, and a wastegate mass flow, $\dot{m}_{wg}$, are calculated using the above-referenced turbine maps. At step 1230, the low pressure turbine mass flow, $m_{lp\_trb}$, is compared to the sum of the high pressure turbine mass flow, $\dot{m}_{hp\_trb}$, and the wastegate mass flow, $\dot{m}_{wg}$, calculated in step 1225. If the sum of the high pressure turbine mass flow, $\dot{m}_{hp\_trb}$, and the wastegate mass flow, $\dot{m}_{wg}$, is greater than the low pressure turbine mass flow, $\dot{m}_{lp\_trb}$, the process 1200 proceeds to step 1235 where Factor3 is updated to a value of Factor3 plus FactorAdj3, and the variable, k, is updated to a value of k+1 (step 1240). If sum of the high pressure turbine mass flow, $\dot{m}_{hp\_trb}$, and the wastegate mass flow, $\dot{m}_{wg}$, is not greater than the low pressure turbine mass flow, $\dot{m}_{lp\_trb}$, the process 1200 proceeds to step 1245 where Factor3 is updated to a value of Factor3 minus FactorAdj3, and the variable, k, is updated to a value of k+1 (step 1240). Steps 1215-1240 are repeated until the variable, k, is equal to $k_{max}$. When the variable, k, is equal to $k_{max}$ (i.e., no longer less than), the process 1200 proceeds to step 1250. At step 1250, the high pressure turbine power, $\dot{W}_{hp\_trb}$, and the low pressure turbine power, $\dot{W}_{trb}$, are calculated, and PreviousFactor3 is set equal to Factor3. Turbine power, $\dot{W}_{trb}$, is also calculated as the sum of the low pressure turbine power, $\dot{W}_{lp\_trb}$, and the high pressure turbine power, $\dot{W}_{hp\_trb}$, as shown below in EQN. 71:

$$\dot{W}_{trb} = \dot{W}_{hp\_trb} + \dot{W}_{lp\_trb} \qquad \text{EQN. 71}$$

The process 1200 then outputs the turbine outlet temperature, $T_{trbo}$, the low pressure turbine mass flow, $\dot{m}_{lp\_trb}$ and the turbine power, $\dot{w}_{trb}$ (step 1255). The process 1200 can then be executed again by the ECU 200.

With reference once again to FIG. 8, the exhaust throttle model module 945 receives the desired low pressure turbine mass flow, $\dot{m}_{lp\_trb\_des}$, the desired turbine outlet pressure, $P_{trbo\_des}$, the desired turbine outlet temperature, $T_{trbo\_des}$, as well as a turbine mass flow correction factor, $CF_{trb}$, and a DOC inlet pressure, $P_{doci}$. The desired exhaust throttle position, $u_{et\_des}$, is determined using the desired turbine outlet pressure, $P_{trbo\_des}$, the desired turbine outlet temperature, $T_{trbo\_des}$, and the DOC inlet pressure, $P_{doci}$, in EQN. 28. EQN. 28 can be rewritten to solve for the exhaust throttle discharge coefficient, $C_{d\_et}$, and a table with an input of the exhaust throttle discharge coefficient, $C_{d\_et}$, and output of exhaust throttle position, $u_{et}$, is used to find the desired exhaust throttle position, $u_{et\_des}$. In some embodiments, an effective area, which is equal to area times discharge coefficient, is used to determine desired exhaust throttle position, $U_{et\_des}$. This technique eliminates an area calibration parameter and uses a table with effective area as the input and position as the output.

Figure 12:
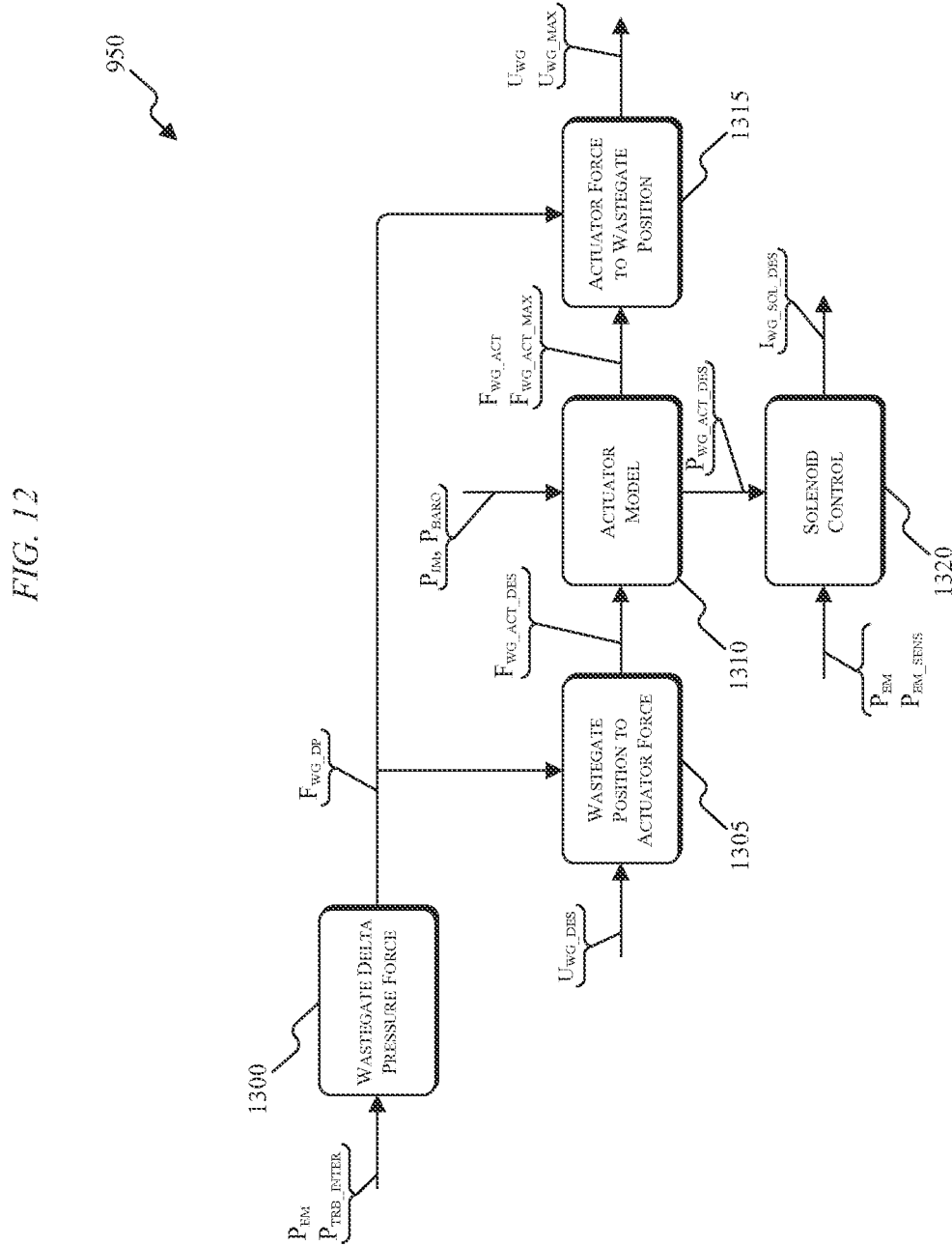
FIG. 12 a wastegate actuator and solenoid control system.

The wastegate solenoid control module 950 of FIG. 8 is illustrated in more detail in FIG. 12. The wastegate solenoid control module 950 includes a wastegate delta pressure force module 1300, a wastegate position to actuator force module 1305, an actuator model 1310, an actuator force to wastegate position module 1315, and a solenoid control module 1320. The wastegate solenoid control module 950 receives the desired wastegate position, $U_{wg\_des}$, from the turbine and wastegate model module 940, as well as an exhaust manifold pressure, $P_{em}$, an intake manifold pressure, $P_{im}$, and a barometric pressure, $P_{baro}$. A wastegate force from delta pressure, $F_{wg\_dp}$, is calculated in the wastegate delta pressure force module 1300 by taking the difference between the exhaust manifold pressure, $P_{em}$, and turbine interstage pressure, $P_{trb\_inter}$, and multiplying the difference by wastegate area, $A_{wg}$, as shown below in EQN. 72:

$$F_{wg\_dp} = (P_{em} - P_{trb\_inter}) \cdot A_{wg} \qquad \text{EQN. 72}$$

A desired wastegate actuator force, $F_{wg\_act\_des}$, is calculated in the wastegate position to actuator force module 1305 by: (1) calculating a force from actuator spring compression, which is the desired wastegate position, $u_{wg\_des}$, multiplied by wastegate actuator displacement maximum, $d_{wg\_act\_max}$, multiplied by a wastegate actuator spring constant, $k_{wg\_act\_spring}$; (2) subtracting the wastegate force from delta pressure, $F_{wg\_dp}$, adjusted for actuator linkage (i.e., multiply by pivot arm radius to wastegate valve, $r_{wg\_valve}$, and divide by pivot arm radius to wastegate actuator, $r_{wg\_act}$); and (3) subtracting the wastegate spring preload, $F_{wg\_preload}$ as shown below in EQN. 73:

$$F_{wg\_act\_des} = u_{wg\_des} \cdot d_{wg\_act\_max} \cdot k_{wg\_act\_spring} - \left(\frac{r_{wg\_valve}}{r_{wg\_act}}\right) \cdot F_{wg\_dp} - F_{wg\_preload} \quad \text{EQN. 73}$$

The wastegate spring preload, $F_{wg\_preload}$, will be a negative number, indicating compression with the sign convention shown in EQN. 67. The spring preload, $F_{wg\_preload}$, tends to hold the wastegate valve 615 closed while the delta pressure across the wastegate valve 615 tends to push it open. A desired wastegate actuator pressure, $P_{wg\_act\_des}$, is calculated by dividing the desired wastegate actuator force, $F_{wg\_act\_des}$, by the wastegate actuator area, $A_{wg\_act}$, and adding barometric pressure, $P_{baro}$, while limiting to intake manifold pressure, $P_{im}$, as shown below in EQN. 74:

$$P_{wg\_act\_des} = \text{minimum}\left(P_{baro} + \frac{F_{wg\_act\_des}}{A_{wg\_act}}, P_{im}\right) \quad \text{EQN. 74}$$

A wastegate actuator pressure, $P_{wg\_act}$, is modeled using a first order filter with desired wastegate actuator pressure, $P_{wg\_act\_des}$, as the input, as shown below in EQN. 75:

$$P_{wg\_act} = P_{wg\_act\_des} + (P_{wg\_act\_previous} - P_{wg\_act\_des}) \cdot e^{-T_s/\tau_{wg}} \quad \text{EQN. 75}$$

where $T_s$ is the software task time step and $\tau_{wg}$ is the wastegate actuator pressure time constant. A wastegate actuator force, $F_{wg\_act}$, is then calculated by taking the difference between the wastegate actuator pressure, $P_{wg\_act}$, and the barometric pressure, $P_{baro}$, and multiplying by wastegate actuator area, $A_{wg\_act}$, as shown below in EQN. 76:

$$F_{wg\_act} = (P_{wg\_act} - P_{baro}) \cdot A_{wg\_act} \quad \text{EQN. 76}$$

A wastegate actuator force maximum, $F_{wg\_act\_max}$, is calculated in the actuator model module 1310 by taking the difference between intake manifold pressure, $P_{im}$, and barometric pressure, and multiplying by wastegate actuator area, $A_{wg\_act}$ as shown below in EQN. 77:

$$F_{wg\_act\_max} = (P_{im} - P_{baro}) \cdot A_{wg\_act} \quad \text{EQN. 77}$$

A wastegate position estimate, $u_{wg}$, is calculated in the actuator model module 1310 by rewriting EQN. 73 and using the wastegate actuator force, $F_{wg\_act}$, as shown below in EQN. 78:

$$u_{wg} = \frac{F_{wg\_act} + \left(\frac{r_{wg\_valve}}{r_{wg\_act}}\right) \cdot F_{wg\_dp} + F_{wg\_preload}}{d_{wg\_act\_max} \cdot k_{wg\_act\_spring}} \quad \text{EQN. 78}$$

A wastegate position maximum, $u_{wg\_max}$, is calculated using a similar equation but with the wastegate actuator force maximum, $F_{wg\_act\_max}$, as shown below in EQN. 79:

$$u_{wg\_max} = \frac{F_{wg\_act\_max} + \left(\frac{r_{wg\_valve}}{r_{wg\_act}}\right) \cdot F_{wg\_dp} + F_{wg\_preload}}{d_{wg\_act\_max} \cdot k_{wg\_act\_spring}} \quad \text{EQN. 79}$$

The relationship between wastegate solenoid current and actuation pressure is defined using a table. The output of the table is a feed forward wastegate solenoid current, $i_{wg\_sol\_ff}$.

The x-input to the table is intake manifold pressure, $P_{im}$, and the y-input to the table is a normalized pressure that is calculated by taking the difference between the desired wastegate actuator pressure, $P_{wg\_act\_des}$, and barometric pressure, $P_{baro}$, and then dividing by the difference between intake manifold pressure, $P_{im}$, and barometric pressure, $P_{baro}$, as shown below in EQN. 80:

$$i_{wg\_sol\_ff} = \text{WastegateSolenoidCurrentTable}\left(P_{im}, \frac{P_{wg\_act\_des} - P_{baro}}{P_{im} - P_{baro}}\right) \quad \text{EQN. 80}$$

A wastegate solenoid proportional term, $i_{wg\_sol\_prop}$, is calculated by multiplying the wastegate solenoid proportional gain, $K_{p\_wg}$, by the difference between the exhaust manifold pressure, $P_{em}$ (estimate), and an exhaust manifold pressure sensor measurement, $P_{em\_sens}$, as shown below in EQN. 81:

$$i_{wg\_sol\_prop} = K_{p\_wg} \cdot (P_{em} - P_{em\_sens}) \quad \text{EQN. 81}$$

Numeric integration is used to update a wastegate solenoid integral term, $i_{wg\_sol\_int}$. At each time step in the software, the wastegate solenoid integral term, $i_{wg\_sol\_int}$, is updated by adding to the previous value, $i_{wg\_sol\_int\_previous}$, to the result of wastegate solenoid integral gain, $K_{i\_wg}$, multiplied by the difference between exhaust manifold pressure, $P_{em}$, and the exhaust manifold pressure sensor measurement, $P_{em\_sens}$, as shown below in EQN. 82:

$$i_{wg\_sol\_int} = i_{wg\_sol\_int\_previous} + K_{i\_wg} \cdot (P_{em} - P_{em\_sens}) \quad \text{EQN. 82}$$

The desired wastegate solenoid current, $i_{wg\_sol\_des}$, is equal to the sum of feed forward wastegate solenoid current, $i_{wg\_sol\_ff}$, the wastegate solenoid current proportional term, $i_{wg\_sol\_prop}$, and the wastegate solenoid current integral term, $i_{wg\_sol\_int}$, as shown below in EQN. 83:

$$i_{wg\_sol\_des} = i_{wg\_sol\_ff} + i_{wg\_sol\_prop} + i_{wg\_sol\_int} \quad \text{EQN. 83}$$

The wastegate solenoid current integral term, $i_{wg\_sol\_int}$, the desired EGR valve position, $u_{egr\_des}$, and the desired exhaust throttle valve position, $U_{et\_des}$, are then provided to the engine 250 to control the operation of the engine 250.

Thus, this disclosure provides, among other things, an air system state observer and control system including feed forward control for controlling the operation of an EGR valve, an exhaust throttle valve, and a wastegate valve for a diesel engine. Various features and advantages are set forth in the following claims.

What is claimed is:

1. A method of controlling exhaust gas temperature for a turbocharged engine using a controller, the turbocharged engine including an aft system, a high-pressure turbocharger, a low-pressure turbocharger, an exhaust throttle valve positioned at an outlet of a turbine of the low-pressure turbocharged, and a wastegate valve for bypassing exhaust gas around a turbine of the high-pressure turbocharger, the method comprising;
   receiving a parameter setpoint command at an inverse engine model;
   monitoring parameters of the engine using a plurality of sensors; receiving measured engine states based on the monitored engine parameters from the plurality of sensors;
   generating measured engine state estimates and controlled engine state estimates using an engine observer model, the controlled engine state estimates being received by the inverse engine model;

determining an observer error based on a difference between the measured engine states and the measured engine state estimates;

generating model corrections based on the observer error, the model corrections being received by the inverse engine model;

determining a desired exhaust throttle valve position using the inverse engine model based on the parameter setpoint command, the controlled engine state estimates; and the model corrections; and adjusting, using the controller, an actual position of the exhaust throttle valve to the desired exhaust throttle valve position.

2. The method of claim 1, further comprising determining, using the controller, a desired turbine outlet pressure.

3. The method of claim 2, further comprising determining, using the controller, the desired turbine outlet pressure based on a desired turbine power, a pressure of an exhaust manifold, an inlet pressure of an after treatment system, and a turbine mass flow setpoint.

4. The method of claim 3, further comprising determining, using the controller, the desired turbine power based on a desired compressor power for a compressor.

5. The method of claim 4, further comprising determining, using the controller, the desired compressor power based on a desired intake manifold pressure for an intake manifold and a desired compressor mass flow for the compressor.

6. The method of claim 1, further comprising selecting, using the controller, the parameter setpoint command from the group consisting of: a desired diluent-to-air ("D/A") ratio from an air system state observer, a desired fuel-to-air ("F/A") ratio from the air system state observer, and a desired exhaust manifold delta pressure from the air system state observer.

7. The method of claim 1, further comprising determining, using the controller, a desired wastegate valve position using the inverse engine model based on the parameter setpoint command, the controlled engine state estimates, and the model corrections; and adjusting, using the controller, an actual position of the wastegate valve to the desired wastegate valve position.

8. The method of claim 7, further comprising determining, using the controller, the desired wastegate valve position based on a wastegate valve maximum position and a low pressure turbine mass flow setpoint.

9. The method of claim 8, further comprising determining, using the controller, the low pressure turbine mass flow setpoint based on a pressure of an exhaust manifold and a desired exhaust manifold pressure of the exhaust manifold.

10. The method of claim 9, further comprising determining, using the controller, the desired exhaust manifold pressure based on a minimum exhaust manifold pressure and a desired exhaust manifold delta pressure of the exhaust manifold.

11. A system for controlling exhaust gas temperature, the system comprising:

a turbocharged engine including an air system, an exhaust throttle valve positioned at downstream of a low-pressure turbocharged turbine, and a wastegate valve positioned in a bypass passage bypassing a high-pressure turbocharger turbine;

a plurality of sensors for monitoring parameters of the turbocharged engine; and an electronic control unit including a processor and a memory, the electronic control unit operable to receive a parameter setpoint command at an inverse engine model, monitor parameters of the turbocharged engine using the plurality of sensors, receive measured engine states based on the monitored engine parameters from the plurality of sensors, generate measured engine state estimates and controlled engine state estimates using an engine observer model, the controlled engine state estimates being received by the inverse engine model, determine an observer error based on a difference between the measured engine states and the measured engine state estimates, generate model corrections based on the observer error, the model corrections being received by the inverse engine model, determine a desired exhaust throttle valve position using the inverse engine model based on the parameter setpoint command, the controlled engine state estimates, and the model corrections, and adjust an actual position of the exhaust throttle valve to the desired exhaust throttle valve position.

12. The system of claim 11, the electronic control unit operable to determine a desired turbine outlet pressure.

13. The system of claim 12, the electronic control unit operable to determine the desired turbine outlet pressure based on a desired turbine power, a pressure of an exhaust manifold, an inlet pressure of an after treatment system, and a turbine mass flow setpoint.

14. The system of claim 13, the electronic control unit operable to determine the desired turbine power based on a desired compressor power for a compressor.

15. The system of claim 14, the electronic control unit operable to determine the desired compressor power based on a desired intake manifold pressure for an intake manifold and a desired compressor mass flow for the compressor.

16. The system of claim 11, the electronic control unit operable to select the parameter setpoint command from the group consisting of: a desired diluent-to-air ("D/A") ratio from an air system state observer, a desired fuel-to-air ("F/A") ratio from the air system state observer, and a desired exhaust manifold delta pressure from the air system state observer.

17. The system of claim 11, the electronic control unit operable to determine a desired wastegate valve position using the inverse engine model based on the parameter setpoint command, the controlled engine state estimates, and the model corrections; and adjust an actual position of the wastegate valve to the desired wastegate valve position.

18. The system of claim 17, the electronic control unit operable to determine the desired wastegate valve position based on a wastegate valve maximum position and a low pressure turbine mass flow setpoint.

19. The system of claim 18, the electronic control unit operable to determine the low pressure turbine mass flow setpoint based on a pressure of an exhaust manifold and a desired exhaust manifold pressure of the exhaust manifold.

20. The system of claim 19, the electronic control unit operable to determine the desired exhaust manifold pressure based on a minimum exhaust manifold pressure and a desired exhaust manifold delta pressure of the exhaust manifold.

* * * * *